United States Patent [19]

Ishii

[11] Patent Number: 5,739,912
[45] Date of Patent: Apr. 14, 1998

[54] OBJECT PROFILE MEASURING METHOD AND APPARATUS

[75] Inventor: Akira Ishii, Tokyo, Japan

[73] Assignee: Nippon Telegraph and Telephone Corporation, Tokyo, Japan

[21] Appl. No.: 770,800

[22] Filed: Dec. 20, 1996

Related U.S. Application Data

[63] Continuation of Ser. No. 533,354, Sep. 25, 1995, abandoned, which is a continuation-in-part of Ser. No. 236,012, May 2, 1994, abandoned, which is a continuation of Ser. No. 873,117, Apr. 24, 1992, abandoned.

[30] Foreign Application Priority Data

Apr. 26, 1991 [JP] Japan .................. 3-123026
Dec. 9, 1991 [JP] Japan .................. 3-349426

[51] Int. Cl.$^6$ .................. G01B 11/24
[52] U.S. Cl. .................. 356/376; 219/124.34; 250/201.6
[58] Field of Search .................. 356/376, 375, 356/1, 2, 4, 5, 445; 250/214 AL, 214 B, 214 C; 219/124.1, 124.34, 130.01, 130.51; 358/36, 37, 166, 167

[56] References Cited

U.S. PATENT DOCUMENTS

| | | | |
|---|---|---|---|
| 4,065,788 | 12/1977 | Meier et al. | 358/166 |
| 4,388,646 | 6/1983 | Strother | 358/166 |
| 4,410,787 | 10/1983 | Kremers et al. | 219/124.34 |
| 4,419,012 | 12/1983 | Stephenson et al. | 250/214 B |
| 4,480,919 | 11/1984 | Asano et al. | 356/376 |
| 4,567,347 | 1/1986 | Ito et al. | |
| 5,151,608 | 9/1992 | Torii et al. | 250/201.6 |
| 5,173,750 | 12/1992 | Laukaitis | 250/214 B |
| 5,198,877 | 3/1993 | Schulz | 356/375 |

FOREIGN PATENT DOCUMENTS

| 0 147 501 | 7/1985 | Japan . |
|---|---|---|
| WO 91/10111 | 7/1991 | WIPO . |

OTHER PUBLICATIONS

Patent Abstracts of Japan, vol. 8, No. 269 (P–319) (1706) 8 Dec. 1984, and JP–A–59 137 805 (Shinmeiwa Kogyo) 8 Aug. 1984.
Patent Abstracts of Japan, vol. 9, No. 83 (P–348) (1806) 12 Apr. 1985 and JP–A–59 212 703 (Matsushita Denki Sangyo) 1 Dec. 1984.
Technisches Messen TM, vol. 51, No. 7/8, Jul. 1984, Munchen De pp. 270–275, P. Drews E.A. 'Optisch–Elektronischer Nahtfuhrungssensor Zur Schweissnahverfolgung'.

(List continued on next page.)

*Primary Examiner*—Hoa Q. Pham
*Attorney, Agent, or Firm*—Finnegan, Henderson, Farabow, Garrett & Dunner, L.L.P.

[57] ABSTRACT

A method and apparatus for object profiling is disclosed wherein a laser beam generated by a laser diode 102 is directed to the object surface 101, the apparatus scans the surface 101 and receives the illuminated point image by a charge storage type one-dimensional array of light receiving elements 107; the array 107 is scanned every predetermined period so as to sense a position of the illuminated point image; the object surface coordinates are then obtained by the principle of triangulation, and thereby profile of the object surface 101 can be measured. The laser beam generated by laser diode 102 is intermittent such that the beam is turned on/off at intervals of a predetermined time, preferably ranging from 10 ns to 100 ns. The received signal during unilluminated (turned-off) period delays one period via the FIFO 119-3, while that during the illuminated (turned-on) period is supplied to the subtraction unit 119-6 without delay. The subtraction unit 119-6 subtracts the signal of the unilluminated period from that of the illuminated period. The external interference light due to arc light of a welding torch, etc., ordinarily having a fluctuation frequency of much lower than 100 kHz, irradiates the array 107 at an almost equal intensity in both of the illuminated and unilluminated periods, so that the interference components can be eliminated by subtraction.

7 Claims, 15 Drawing Sheets

OTHER PUBLICATIONS

Optical Engineering, vol. 24, No. 6, Nov. 1985, Bellingham US pp. 975–977, G. Bickel E.A. 'Trianqulation With Expanded Range of Depth'.

C.G. Morgan et al., "Visual guidance techniques for robot arc–welding," Department of Engineering Science, pp. 390–399.

An Improvement on Two–dimensional Position Sensitive Semiconductor Device, Y. Terada et al., Japanese Journal of Optics, A Publication Of The Optics Division, The Japan Society Of Applied Physics, vol. 12, No. 5, 1983, pp. 367–373.

Silicon Position Sensing Detectors For Precision Measurement And Control, R.M. Madden, Proceedings Of The SPIE, vol. 153, Advance In Optical Meterology, 1978, pp. 101–107.

A Real–time Optical Profile Sensor For Robot Arc Welding, Oomen et al, Proceedings Of The SPIE, vol. 449, Intelligent Robots: RoViSeC3, 1983 pp. 62–71.

Development Of A Laser Based Sensor For Arc Welding Robot, G. Ito, Japan Industrial Robot Association, Robot, No. 54, pp. 58–65.

$x_i = V_c \sin\theta_i$ $z_i = V_c \cos\theta_i$

LIGHT RECEIVING SURFACE OF SENSOR

CENTER OF LIGHT RECEIVING LENS $V_{pi} = \dfrac{ld}{U_i}$ $V_c = \dfrac{ld}{U_i} - (V_a + V_b)$ $U_i = U_o + k \times j_{gi}$

SECTIONAL COORDINATES

SECTIONAL COORDINATES

SECTIONAL COORDINATES

SECTIONAL COORDINATES

SECTIONAL COORDINATES

SECTIONAL COORDINATES

OBJECT PROFILE MEASURING METHOD AND APPARATUS

This application is a continuation of application Ser. No. 08/533,354, filed Sep. 25, 1995, which is a continuation-in-part of application Ser. No. 08/236,012, filed May 2, 1994, which is a continuation of application Ser. No. 07/873,117, filed Apr. 24, 1992, all now abandoned.

BACKGROUND OF THE INVENTION

1. Field of the Invention

The present invention relates to an object profile measuring method and apparatus for measuring the position and profiles of a work object, which are required for robots and automated equipment to carry out arc welding, sealing work, deburring work and the like, in the place of human workers.

2. Background Art

Background art concerning arc welding work will be explained by way of an example. In order to operate a welding torch held by a robot and the like tracing with the welded object so as to automate the welding work, the profile of the object should be measured for sensing the position of the seam line. In an applied robot vision sensor, a non-contact type sensor is preferable, because of less interference with the weld object, flexibility in application of various types of the seam profile, and advanced sensing speed. Conventionally, there is known a method wherein striped illumination is directed at an object, illumination lines appearing on the object surface are detected by a television camera, and thereby the profile of the object surface is measured. According to another method, a laser beam is directed to an object, the object surface is scanned by the illuminated point, then position of the moving illuminated point is sensed by a PSD (Position Sensitive Device), CCD (Charge Coupled Device) image sensor, or other arrays of light receiving elements; then the three-dimensional position of the illuminated point is calculated by the principle of triangulation. The above-described "PSD" is, for example, disclosed in "An Improvement on Two-dimensional Position Sensitive Semiconductor Detector," by Y. Terada and K. Yamamoto, Japanese Journal of Optics, a Publication of the Optics Division, the Japan Society of Applied Physics, vol. 12, No. 5, pp. 367–373, 1983; or "Silicon Position Sensing Detectors for Precision Measurement and Control," by Madden, R. M., Proceedings of the SPIE vol. 153, Advance in Optical Metrology, 1978, pp. 101–107.

Summary of the conventional technology will be described with reference to FIG. 11.

In FIG. 11, a V-shaped groove 202 is formed on a weld object 201. An arc welding torch 200 seams the object 201 along with the V-shaped groove 202. The torch 200 is fitted with a sensor 203 which contains a laser diode 204, a lens 205, and an array of light receiving elements 206. A laser beam 207, which is generated by the laser diode 204, and which has its optical path alternated by a mirror 210, is diffusively reflected at a point P on the weld object 201. Then, a reflected laser light 208 is focused by the lens 205, and forms an image at a point on the array of light receiving elements 206. The length of a base line L from the reflection center point of the mirror 210 to the center point of the lens 210, and an angle $\theta_1$ formed by the base line L and the beam 207 are predetermined values in accordance with the mechanical configuration of the sensor 203. Furthermore, incident angle $\theta_2$, which is formed by the base line L and the laser light 208, can be determined according to the focusing position on the array 206. Accordingly, when the length of line L and angles $\theta_1$ and $\theta_2$ are determined, the coordinates of the point P can be calculated.

The sensor 203 scans the weld object 201 along with a scanning line S, thereby measuring the profile and position of the V-shaped groove 202. This scanning method can be realized by rotating the sensor 203 around the torch 200, or by inserting a vibrating mirror on the progression path of the laser beams 207. Then, the position of the torch 200 is controlled in response to the measurement results, whereby torch 200 traces the V-shaped groove 202 while maintaining a suitable distance d from the weld object 201.

Incidentally, there is known a problem that when the laser beam 207 is diffusively reflected at the point P on a flank of V-shaped groove 202, a portion of the reflected beam may be further reflected on the opposite flank and then focused on the array 206 as stray light 209. Hence, there is a fear that the measured results may be erroneous. However, a certain amount of the generation patterns of the stray light 209 can be estimated in accordance with the profile of the V-shaped groove 202. Therefore, if an algorithm for eliminating the erroneous pattern is previously constructed, correct measurement results can be obtained.

The object profile measuring apparatuses, especially for those employed for the arc welding work and the like, have the following problems awaiting solution.

(a) To measure the profile of the position as close as possible to the welding torch.

The profile of weld object 201 shown in FIG. 11 may be deformed during the welding work. Especially, when a thin steel plate such as a chassis of an automobile is seamed, the deformation value will be enlarged. Therefore, in order to control the torch 200 with high precision, the profile of the position as close as possible to the welding position must be measured. In the case of the welding works of a chassis for an automobile, the ideal distance between the welding point and the profile measuring point is approximately 10 mm. If the real distance is larger than the ideal distance, the weld object 201 must be fitted here and there with fixtures so as to minimize the deformation, and therefore extra fitting work is required. On the other hand, when the welding point and the profile measuring point are close, another problem may occur in that the arc light from the torch is directed into the array of light receiving elements 206, whereby the profile measuring work is obstructed. Accordingly, there is a problem about how to eliminate the influence of the arc light.

(b) To embody the sensor as small and as thin as possible.

The arc welding torch 200 is fitted at the end of an arm of the robot, conducted into an internal part of a complex structure such as an automobile via a narrow aperture, and then executes the welding work. Therefore, the sensor 203 must be embodied as small as and as thin as possible so as not to obstruct the welding work.

(c) To measure profiles of various types of seam.

As described above, according to the apparatus shown in FIG. 11, in order to eliminate the influence by the stray light 209, a preferred algorithm concerning the profile of the V-shaped groove 202 must be prepared.

However, it is possible that in relation to the welding work of the automobiles and the like, one welding robot must be adopted for various seams of a variety types of automobiles, so that the profiles of seams are highly variable. Therefore, it is troublesome to prepare suitable algorithms according to the various profiles. Accordingly, there is a desire for realizing a technology in which the influence by the stray light can be eliminated irrespective of the profile of the seams.

In order to solve the above-described problems, several technologies have been proposed.

First, in order to solve the problem (c), there is known a technology employed for the products of Oldelft Co. Although the details of the technology is disclosed in Oomen, G. L. and Verbeek, W. J. P. A., "A Real-time Optical Profile Sensor for Robot Arc Welding," Proceedings of the SPIE, vol. 449, Intelligent Robots: RoViSeC3, 1988, pp. 62–71, an outline will be described below with reference to FIG. 12.

In FIG. 12, the torch 200 is fitted with a motor 220; the shaft 221 thereof is projecting from the torch 200 in its radial direction. The shaft 221 is further fitted with mirrors 224 and 225. The rotation angle of the motor 220 is measured by an angle sensor 222, whereby a He-Ne laser 214 generates a laser beam in response to the measured value. The generated laser beam is focused by an objective lens 223, reflected by the mirror 224, weld object 201 and mirror 225 in that order, focused by the lens 205, and focused on the array of light receiving elements 206.

According to the construction shown in FIG. 12, a primary reflected light, which is reflected on the plane defined by the laser beam 207 and the revolution axis of the shaft 221, is focused on the array of light receiving elements 206, while secondary and higher-order reflected light due to multiple reflection would not be focused on the array 206. Therefore, the influence of stray light can be eliminated.

However, according to the configuration shown in FIG. 12, the shaft 221 must be projected in the radial direction of the torch 200. Therefore, this technique is insufficient in that the structure will inevitably be large. In order to ease the insufficiency, the length of the shaft 221 is shortened. However, shortening of the shaft 221 requires shortening of the length of the base line L (see FIG. 11); requires minimizing the difference of focused positions on the array of light receiving elements 206 due to the surface profile of the weld object 201; and therefore requires high resolution elements for the array 206.

To solve the problem (a), another technology, which utilizes the fact that the fluctuation frequency components of the arc light intensity are concentrated below a specific frequency (i.e., 100 kHz), have been established in which the laser beam is modulated by a sufficient high frequency (e.g., several hundreds kHz), an illuminated point is sensed by a one-dimensional photodiode array, the modulation frequency components thereof are then extracted by a filter from the photoelectric conversion outputs by the photodiodes, and thereby the point illuminated by the laser beam is distinguished and sensed. Such a technology is, for example, disclosed in "Development of Laser Based Sensor for Arc Welding Robot", by G. Ito, Japan Industrial Robot Association, "Robot," No. 54, pp. 58–65; and U.S. Pat. No. 4,567,347.

According to the technology disclosed by Ito, the laser beam and arc light are distinguishable due to the frequencies thereof. In order to realize such a distinction, the modulated laser beam must be exactly sensed by the light receiving elements; therefore, the CCD image sensor having the storage characteristic is difficult to be adopted as the light receiving element. In fact, according to the technology disclosed by Ito, a photodiode array is adopted as the light receiving elements.

However, compared with the CCD Image sensor and PSD, the photodiode array is not generally manufactured nor is it widely used as a light receiving device. Therefore, the photodiode array is less freedom of designing and may be expensive. Furthermore, compared with a CCD, the photodiode array is disadvantageous because of low sensitivity. Therefore, according to the technology disclosed by Ito, the light receiving device must be enlarged in order to obtain the required sensitivity, so that the length of the base line L (See FIG. 11) must be enlarged. In particular, if the configuration shown in FIG. 12, which is advantageous for eliminating stray light, is adopted for the technique according to Ito, the apparatus must be even larger.

SUMMARY OF THE INVENTION

It is accordingly, a primary object of the present invention, to establish a method for measuring the range and shape of the object, especially for realizing the sensor by a nominal semiconductor laser device and a charge storage type CCD line sensor having high sensitivity and high resolution characteristics, and thereby realize an object profile measuring apparatus which eliminates the influence of the arc light, stray light, and other external light, and has the features of lower cost and smaller size.

In a first aspect of the present invention, there is provided an object profile measuring method wherein a laser beam is directed to an object surface, an illuminated point on the object surface is sensed by a charge storage type one-dimensional array of light receiving elements, the one-dimensional array of light receiving elements is scanned during every predetermined period so as to sense a position of the illuminated point, coordinate of the object surface is calculated based on the principles of triangulation, and thereby surface profile of the object is determined; the present invention further providing:

a first process wherein an illumination period in which the laser beam is projected is synchronizing with a read out scanning operation of the one-dimensional array of light receiving elements, and a unilluminated period in which the laser beam is not projected, are alternated;

a second process wherein signals read out from the one-dimensional array of light receiving elements is delayed for one read out scanning period and then generated; and a third process wherein a difference value between a read out signal from the one-dimensional array of light receiving elements during the illumination period, and a read out signal from the one-dimensional array of light receiving elements during an unilluminated period which is proximate to the illumination period, is obtained;

whereby the coordinate is obtained in accordance with the difference value so as to eliminate interference from external light components.

The external interference light component from the welding torch and the like ordinarily has a low frequency spectrum. Hence, the level of the external interference light during the illuminated period and which of the proximate unilluminated period will be almost of the same value. The present invention eliminates the external interference light components during the third step. In other words, components which are due to the laser beam and which are due to the arc light, etc., are separated time-dependently. This principle means that even if the components due to the laser beam are somewhat graduated, as long as the signal levels are reproduced, the present invention is able to sense the laser beam. Therefore, even if the light receiving elements have charge-storage characteristics, influences due to the characteristics can be minimized. Accordingly, the present invention permits the use of high sensitivity charge-storage type CCD line image sensors, for example.

DESCRIPTION OF THE PREFERRED EMBODIMENT

First Embodiment

Figure 1:
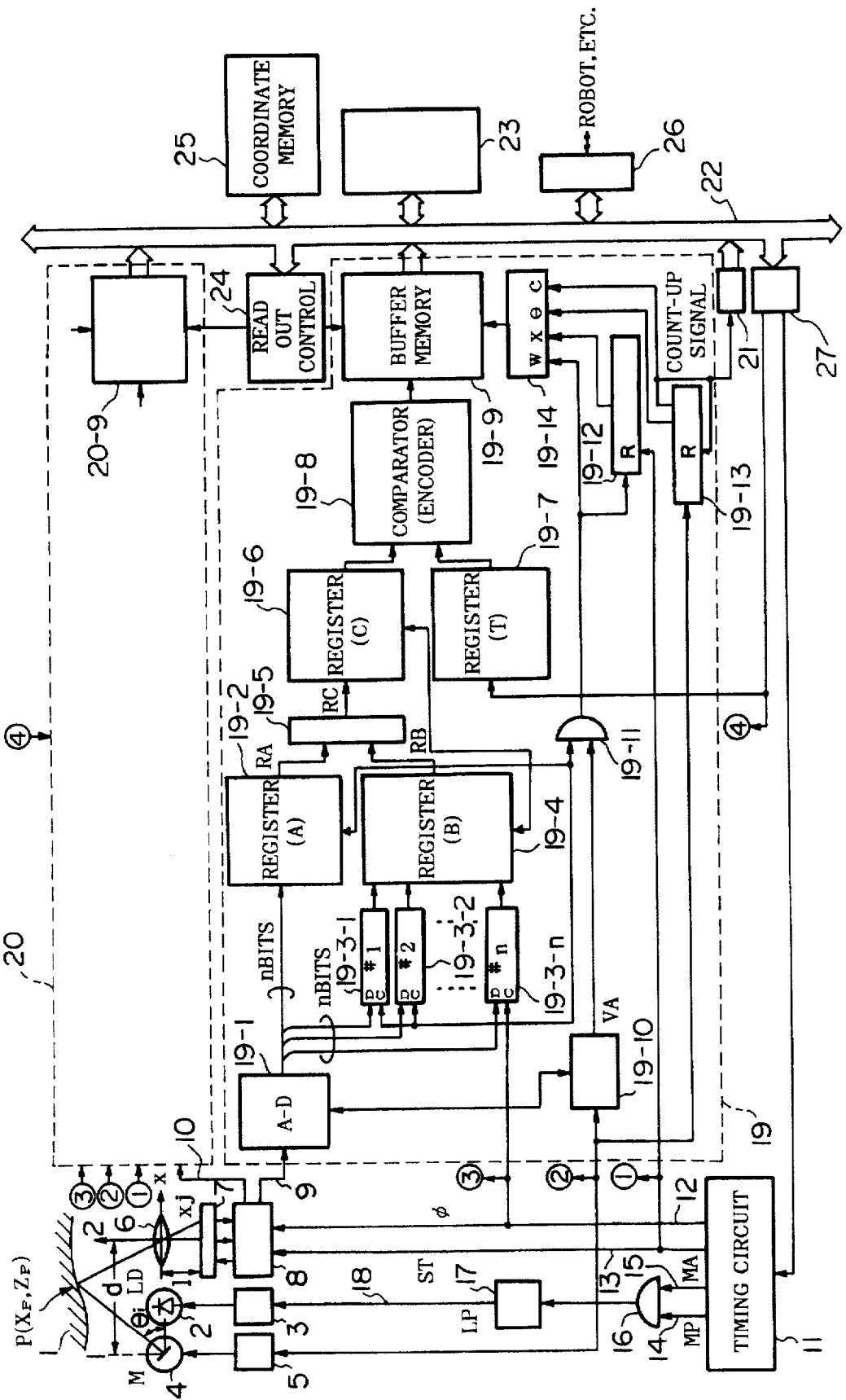
FIG. 1 is a block diagram showing a configuration of an object profile measuring apparatus according to a first embodiment of the present invention, wherein a laser beam scans the object surface, and the illuminated point thereof is measured by the apparatus, thereby measuring the object surface profile.

Next, description will be given with respect to the first embodiment of the present invention. In FIG. 1, there is shown a profile measured object 1, a laser diode 2, a laser diode driving circuit 3, and a mirror-type light deflector 4 which deflects the laser beam so as to scan the measured object 1 by the deflected beam. The light deflector 4 may be embodied by a galvanometer or other conventional light deflection means such as a motor having the rotation axis thereof fitted with a mirror. Alternatively, for certain purposes, such as a non-mechanical type deflector, an acousto-optic light deflector is preferable for its high speed operation in spite of its narrow deflection angles. The apparatus further contains a light deflector driving circuit 5, a lens 6 which takes the laser beam directed to the object 1 as an illuminated point image, and an array of light receiving elements 7 (typically a CCD linear image sensor) for translating the illuminated point image into electronic signals. In order to describe the embodiment more specifically, the element 7 shall be considered as an CCD linear image sensor having "128" of effective light receiving elements.

Each light receiving element generates a pixel signal for indicating the illuminated point. A linear sensor read-out circuit 8 generates various types of drive signals to the CCD linear image sensor 7 in order to drive the sensor 7, and amplifies and outputs a read out signal thereof. As an example of the CCD linear image sensor 7, there is adopted a sensor which contains two CCD shift registers which respectively read out stored charges of odd-numbered and even-numbered light receiving elements simultaneously and parallely in order to double the read out speed of the pixel signal. Therefore, signals 9 and 10 shall respectively be defined as the pixel signals from the odd-numbered array of light receiving elements and those from the even-numbered array of light receiving elements.

In this embodiment, the frequency of the pixel clock signal supplied to the CCD linear image sensor in order to read out the pixel signal is set to "20 MHz". The apparatus further contains a timing circuit 11 for separating various types of signals in order to operate the object profile measuring apparatus according to the first embodiment. The numeral 12 designates a pixel clock signal φ, the numeral 13 designates a linearly scanning start signal ST which defines a read out repetition period of the CCD linear image sensor, and the numeral 14 designates a mirror incremental rotation signal MP which defines a light deflection angle $θ_1$ due to the rotation of the mirror fitted to the light deflector 4. The numeral 15 designates a signal MA which indicates an effective light deflection period between a start position of scanning due to the light deflection by the mirror, and its terminal position. The signals 12, 13, 14, and 15 are synchronizing with each other. The numeral 16 designates a gate circuit which passes the mirror incremental rotation signal MP during the effective light deflection period indicated by the signal MA. The numeral 17 designates a lighting signal generation circuit which delays the mirror incremental rotation signal MP via the gate circuit 16 for a predetermined delay time, then generates an emitting signal (LP) 18 the pulse width thereof equals to the laser light emitting period.

The light deflector driving circuit 5 receives the mirror incremental rotation signal MP 14 in order to increase the mirror angle of the mirror-type light deflector 4 according to a prespecified angle, generates a drive current in order to deflect the laser beam to a new irradiation position on the object, and then supplies the drive current to the mirror-type light deflector 4. After the mirror-type light deflector 4 is set to the new light deflection angle, the laser diode driving circuit 5 receives the emitting signal 18 and supplies a drive current pulse to the laser diode 2 in order to feed the required lighting output. The light deflector driving circuit 5 receives all of the mirror incremental rotation signal MP during the effective light deflection period signal MA is generated, and when the light deflection operation at the terminal position is finished, the circuit 5 supplies a drive signal to the mirror-type light deflector 4 in order to return to the start position. Furthermore, the line sensor read-out circuit 8 receives the pixel clock signal (φ) 12 and the linearly scanning start signal (ST) 13 and generates various types of drive signals required for operating the CCD linear image sensor 7.

The circuit block 19, a major part of the measuring apparatus according to the present embodiment, receives the read out output 9 from the odd-numbered array of light receiving elements of the CCD linear image sensor 7, and senses the picture signal of the illuminated point on the object from the laser projection by means of separating the picture signal from the external light and other various types of obstruction signals, and operates as follows. The numeral 19-1 designates an A-D converter (i.e., Analog-to-Digital Converter) which converts an analog pixel signal 9 to a digital signal of n-bits, where the value "n" is determined according to the required dynamic range of the target pixel signal; for example, n may equal "10". The converted signal is then stored in a register (A) 19-2, and furthermore, all the bits thereof are respectively held by "n" of shift registers 19-3-1~19-3-n. The number of stages of the shift registers are equal to the number of the pixel clock signals (φ) 12 which are produced during the generation period of the linear scanning start signal (ST) 13. According to this embodiment, the number of the stages shall be larger than "64" which is the number of odd-numbered light receiving elements. The output signals of the last stages of the shift registers 19-3-1~19-3-n provides a pixel signal which is delayed one line read out time compared with the output signal of the AD converter 19-1. The delayed pixel signal is then stored in a register (B) 19-4.

A subtraction unit 19-5 sets the content RA of the register A as the minuend, sets the content RB of the register B as the subtrahend, executes a subtraction, and supplies the subtraction result RC to a register (C) 19-6. The above-described AD converters and registers receive the pixel clock signal φ 12 and operate respectively. The numeral 19-7 designates an n-bits register (T) which holds the standard value RT to be compared with the content RC of the register C. The numeral 19-8 designates a comparator or an encoder which receives the content RC of the register C and the content RT of the register T. As for an output signal, the comparator 19-8 generates a difference value or a digital value which becomes "1" when the difference is a positive value (i.e., RC>RT), and which becomes "0" when the difference is zero (i.e., RC=RT) or a negative value (i.e., RC<RT). Alternatively, if the logic circuit is so designed, a universal coded value can be generated.

The output signal of the comparator 19-8 is then stored in a buffer memory 19-9 by each pixel. The buffer memory 19-9 has its memory capacity for storing pixel data (i.e., output signal of the comparator 19-8), the number of which equals the multiplication value of the number of the odd-numbered effective pixels (i.e., "64" in this embodiment) in line sensor 7, by the number of the measuring point per one deflection period (i.e., equals to the number of the mirror incremental rotation signal MP to be supplied to the light deflector driving circuit 5 during the effective light deflection period, "256" in the present embodiment). Furthermore, in order to parallely execute a writing operation of the pixel data occurred in the continuous light deflection period with the read out operation of stored data concerning the previous light deflection period, the buffer memory 19-9 is structured as a double buffer memory which contains two memory areas of same memory capacity, so as to complimentarily execute the read out and writing operations respectively, and to alternate the operations with each light deflection.

Next, writing operation to the buffer memory 19-9 will be described. The numeral 19-10 designates a gate pulse generation circuit, which, for example, begins a count operation of the pixel clock signal φ when the mirror incremental rotation signal MP is generated via the gate circuit 16, starts a gate pulse when the stored value thereof reaches a pre-specified value, and stops the gate pulse when the stored value is reached to another prespecified value, and thereby generates a gate pulse signal VA which indicates the generation period of the effective pixel signal (i.e., "64" odd-numbered pixels in this embodiment) contained in the read out output signals of the CCD linear image sensor 7 just after the generation of emitting signal LP which is generated after a predetermined time elapsed from the generation of the mirror incremental rotation signal MP. The numeral 19-11 designates a gate circuit which selectively transmits the pixel clock signal 12 during the effective pixel period by means of the gate pulse signal VA.

The effective pixel clock signal is counted by an X-address counter 19-12, the counted value thereof is then becomes a part of a memory address as a counted value j which determines the pixel position of the illuminated point on the measured object due to the directed laser beam. The numeral 19-13 designates a θ-address counter which counts up the effective mirror incremental rotation signal MP generated by the gate circuit 16, and then generates the counted value i as a part of the memory address, where the value i designates the deflection angle of the laser beam. The numeral 19-14 designates a write control circuit which supplies the output signal of the comparator 19-8 corresponding to the effective pixel clock signal to buffer memory 19-9 wherein the writing address of the memory 19-9 is specified by the counted value of the X-address counter 19-12 and the designated value by the θ-address counter 19-13, when the effective pixel clock signal is supplied to a write enable input port W of the circuit 19-14. The X address counter 19-12 is initially reset by a scanning start signal ST at the beginning of read out operation by the line sensor 7. On the other hand, when the θ-address counter 19-13 counts up all ("256" in this embodiment) of the effective mirror incremental rotation signal MP, the counter 19-13 supplies a count-up signal 19-15 to a buffer memory switching signal port C of the write control circuit 19-14 whereby the writing object is alternated to another buffer memory which is to obey a writing operation in the next, and resets the θ-address counter itself.

Furthermore, the count-up signal 19-15 is also supplied to an interruption processing circuit 21, whereby a CPU (i.e., central processing unit) 23 is informed of the termination of the writing operation via the system bus 22. When the CPU 23 is informed of the termination of the writing operation, the CPU 23 instructs the read out control circuit 24 via the system bus 22 to execute the read out operation of the pixel data from the buffer memory which is Just terminated from the writing operation. The apparatus further contains a circuit block 20 having a configuration similar to the circuit 19 and is provided for the pixel signal 10 as well as the circuit block 19 for the pixel signal 9; the circuit block 20 stores the pixel data generated by the even-numbered array of light receiving elements to a double buffer memory 20-9 contained in the circuit block 20 itself. Therefore, the CPU 23 supplies the read out command to the read out control circuit 24 so as to alternately read out the buffer memory 19-9 and 20-9, whereby all the pixel data ("128×256" pixels in this embodiment) are read out. Concerning to the pixels which are contained in the read out pixels and having their values larger than zero, coordinates $x_p$ and $z_p$ of the laser beam directed position are calculated according to an X-address value j which determines an arrangement on the array of light receiving elements, and θ-address value i which determines the laser beam deflection angle; then the values $x_P$ and $z_P$ are stored in the coordinate memory 25.

The stored values indicate a locus profile (i.e., coordinates) of the object surface scanned by the laser beam. The obtained coordinate data are then generated via the input-output interface circuit 26 so as to indicate the object profile on a CRT display, or are subjected to a shape recognition processing by the CPU 23 in the case of arc welding for example, in order to detect the seam line position and to transfer the position data thereof to the welding robot via the input-output interface circuit 26. The numeral 27 designates a system control interface circuit. At the start of the measurement, the CPU 23 sets the standard value RT to the register (T) 19-7 via the bus 22 and the circuit 27, and further initializes the timing circuit 11 and other components of the system.

Figure 2:
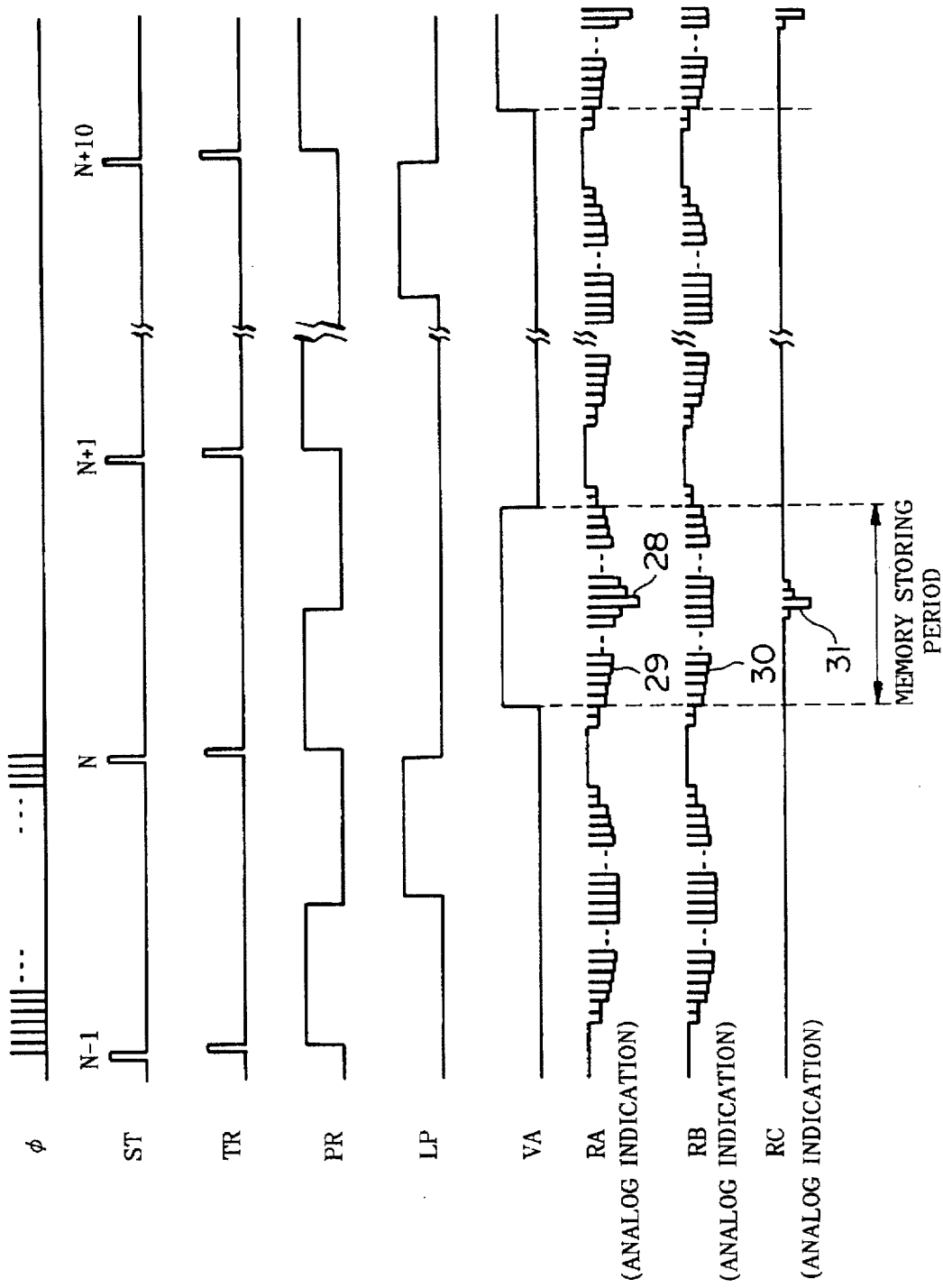
FIG. 2 is a timing chart showing the timing relationship between major signals during illuminated point measuring operation according to the embodiment shown in FIG. 1.

Next, the timing relationship between the various signals of the present embodiment will be described with FIG. 2. The greek letter φ designates a pixel clock signal, and ST designates a linearly scanning start signal. The transfer signal TR, which is produced synchronizing with the linearly scanning start signal ST, is supplied to a gate terminal of the CCD linear image sensor 7 which controls the transfer of photo charge for the illuminated point image stored in the light receiving elements to the CCD shift register, and thereby determines the parallel transfer timings to the array of light receiving elements. When the translation is terminated, the CCD shift register is driven by the pixel clock signal φ, whereby the pixel signal is read out. When the stored charge is transferred, the array of light receiving elements is set to a preparation condition for the next storage of charge. The stored charge reset signal PR is supplied to a gate terminal of the light receiving elements, which controls the storage and loss of the photo-current, and thereby eliminates the charge storage during the continuation period thereof. Therefore, when the stored charge reset signal PR is set to the "OFF" condition, the storing of charge is enabled so that the charge storage for the illuminated point image will be performed. In other words, the stored charge reset signal PR has the function of a so-called electronic shutter.

Such a CCD linear image sensor with the electronic shutter function can be obtained commercially. The light emitting signal LP appears every 10 period of the linearly scanning start signal ST according to the present embodiment, and is further synchronized with the "OFF" period of the stored charge reset signal PR whereby it appears only in this period. Accordingly, compared with a condition such that the external interference light irradiates the surface of the light receiving elements during the entire period, so that charge loss occurs in the "ON" period of the stored charge reset signal PR, the present embodiment is advantageous in that there is less loss of photo energy, because all portions of the laser beam controlled by the light emitting signal LP are effectively transferred to the charge during the "OFF" period of the stored charge reset signal PR. Accordingly, the signal-to-noise ratio between the illuminated point output and the external interference light can be improved. VA designates a gate pulse signal which indicates the generation period of the effective pixel signal. RA designates the content of the register (A) 19-2, which is shown as amplitude of an analog signal converted from the original digital signal in order to be visually understandable. RB designates the content of the register (B) 19-4, which is also shown as the amplitude of an analog signal.

The contents RC of the register (C) 19-6, also shown as the amplitude of an analog signal, indicates the result of the signal RA subtracted by the signal RB in the subtraction unit 19-5, where the signal RB delays one line period from the signal RA. A portion 28 of the signal RA is the illuminated point output signal, which is superimposed on the electronic point output signal 29 due to the external interference light. An electronic output signal 30, generated in the period corresponding to the sisal RB, delays one line period, so that the signal RB does not include any illuminated point output signal components but includes only the output signal component due to the external interference light. In this case, the pixel clock frequency is "20 MHz", and the number of light receiving elements of odd-numbered (or even-numbered) arrangement is "64"; the period of the linearly scanning start signal can be set to 4 μs (>50 ns×64=3.2 μs). Therefore, because most of the fluctuation frequency components of the external interference light such as the arc light are satisfactorily lower than "100 kHz" (i.e., the fluctuation period thereof is satisfactorily longer than 10 μs), the change of the external interference light, relating to the electronic output signals 29 and 30 due to the delay time of one line period, are satisfactory small. Therefore, the output 31 during the period corresponding to the subtraction output signal RC consists of the illuminated point output signal in which the influence due to the external interference light has been nearly eliminated. The output signal concerning this period is then stored in the buffer memory 19-9 (or 20-9) during the continuation period of the gate pulse signal VA. Furthermore, according to such a delay subtraction operation, fixed pattern undesired signals, due to the sensitivity unevenness of the light receiving elements, can be eliminated simultaneously.

Figure 3:
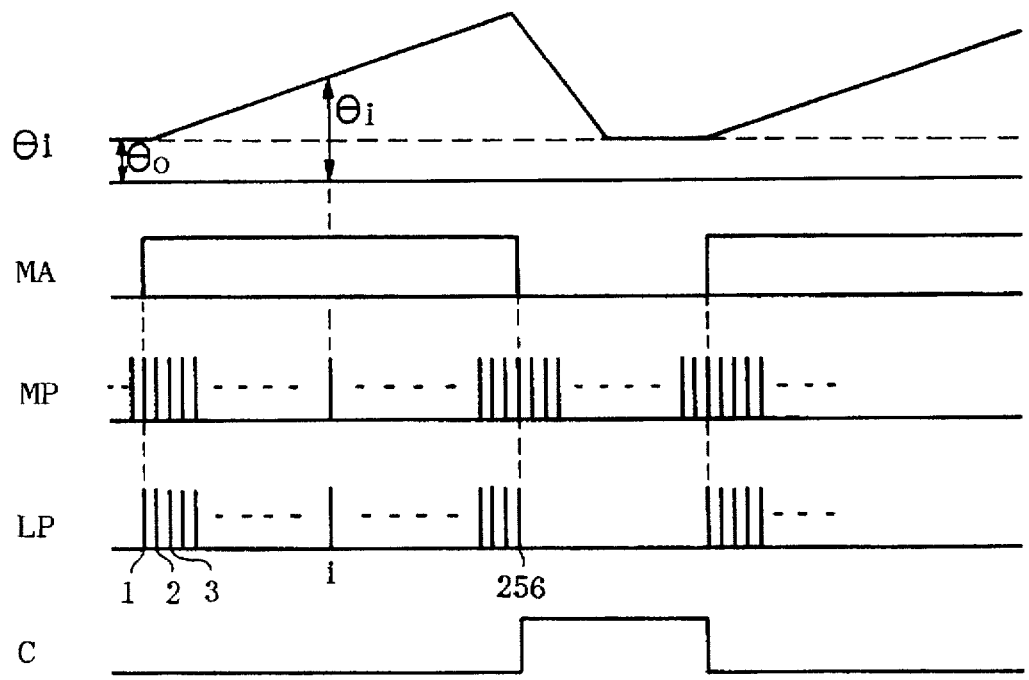
FIG. 3 is a timing chart showing the timing relationship between various signals concerning a mirror deflection operation and a pulse operation of the laser diode during one light deflection scanning period by a mirror.

FIG. 3 shows the relationship between signals during one deflection period of the mirror-type light deflector 4.

The symbol $θ_1$ designates a deflection angle of the laser beam corresponding to the X axis wherein the positive (i.e., up to the right) sloping portion indicates the deflection angle of the effective light deflection period. The symbol MA designates an effective light deflection period signal indicating the effective light deflection period, and MP designates an incremental rotation sisal for the mirror. The light emitting signal LP contains pulse signals, the number of which is equal to the number of measured points during the effective light deflection period ("256" pulse signals in the present embodiment). The count-up signal C of the θ-address counter 19-13, which indicates that the deflection scanning of the all measuring point during one deflection period is terminated, is used as a switching signal for the buffer memory 19-9 (or 20-9), a reset signal for the θ-address counter 19-13, and an interruption signal to the CPU 23.

Figure 4:
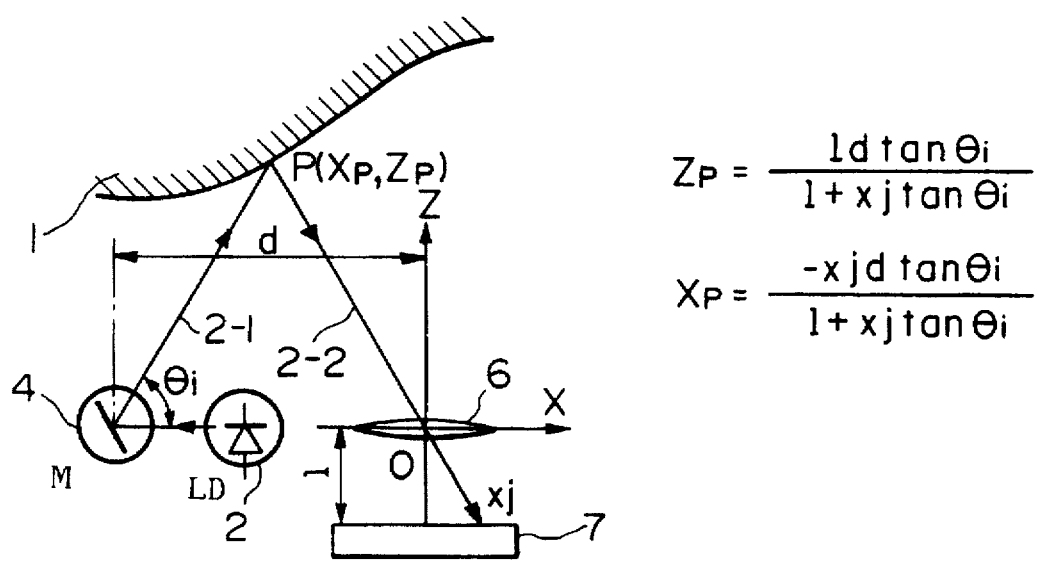
FIG. 4 is a drawing showing a configuration of an optical part of a normal object profile measuring apparatus and the calculation principle for coordinating the laser irradiation point.

FIG. 4 shows a method for calculation of coordinates $x_P$ and $z_P$ of the laser irradiation point P from the deflection angle $θ_i = ai + θo$ (herein, i=1, 2, . . . , 256; "a" and $θ_o$ are constants) and a X-coordinate value $x_j = k × (2j−1−64)$ (herein, j=1, 2, . . . , 64; k is a constant) of the odd-numbered light receiving elements or the X-coordinate value(s) $x_j = k × (2j−64)$ (herein, j=1, 2, . . . , 64; k is a constant) of the even-numbered light receiving elements, where i and j are the θ address value and the X address value, respectively concerning the pixel data of the illuminated point stored in buffer memory 19-9 (or 20-9). The numeral 2-1 designates a deflected laser beam, and 2-2 designates reflected light or diffused light from the irradiated point P. The coordinate axis Z which coincides with the optical axis of the lens 6, and the coordinate axis X which intersects orthogonally with the coordinate axis Z at the center O of the lens 6, are respectively located on the light deflection surface (i.e., illustration surface). The rotation axis of the mirror of the mirror-type light deflector 4 intersects orthogonally with the illustration surface, and d designates the distance between the rotation axis of the mirror which intersects with the coordinate axis X and the center point O of lens 6.

Figure 5:
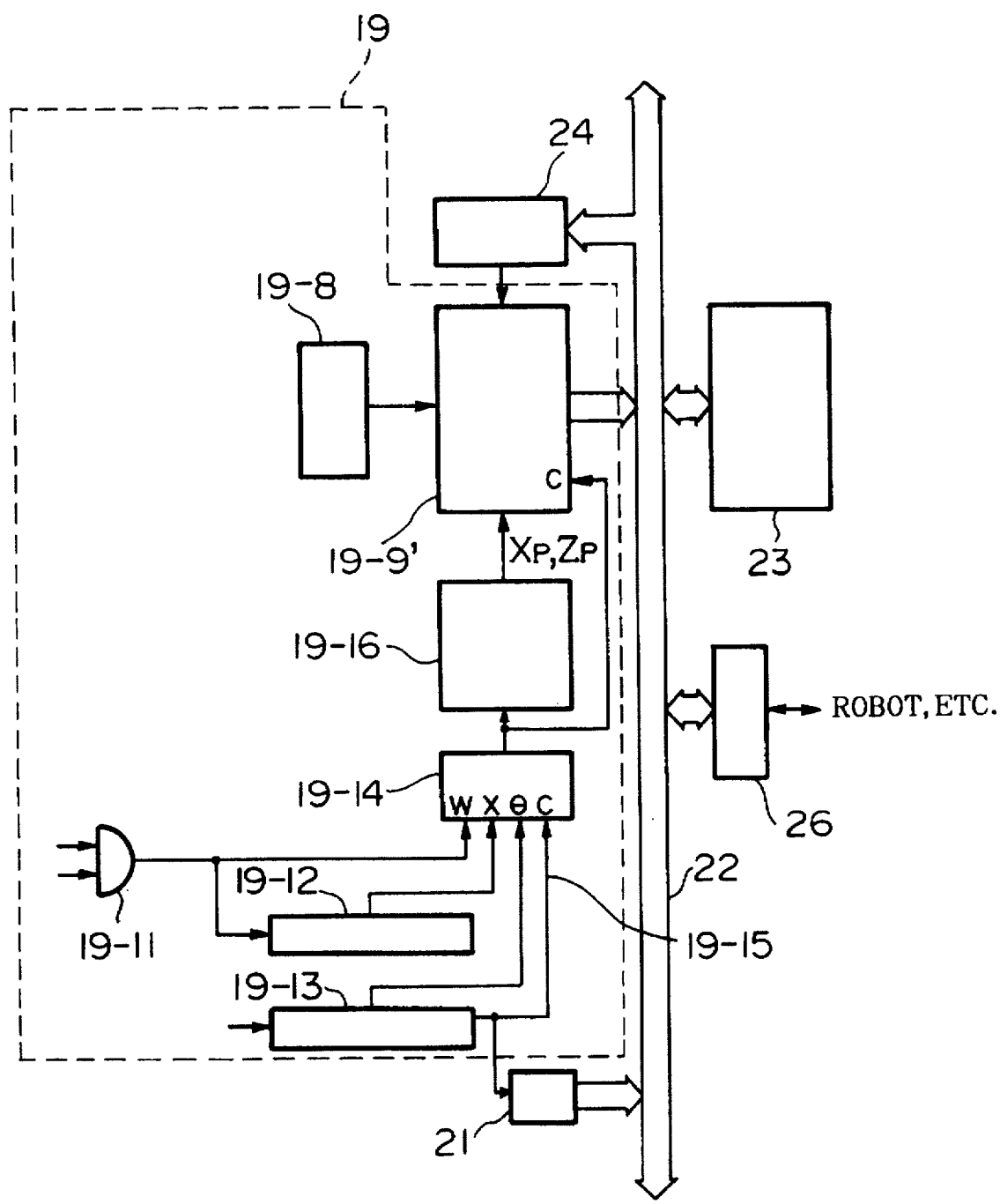
FIG. 5 is a block diagram showing a partial configuration of the object profile measuring apparatus according to the first embodiment of the present invention, wherein coordinates are calculated by means of a look-up table memory.

The symbol 1 designates the distance between the center O of the lens and the light receiving surface of the array of light receiving elements 7. Incidentally, as an alternative to calculating the $x_P$ and $z_P$ due to the formulae shown in FIG. 4 each time by means of the CPU, coordinate values $x_P$ and $z_P$, corresponding to address values i and j of the pixel data of the illuminated point, can be previously calculated and stored in the look-up table so as to rapidly obtain the coordinate values $x_P$ and $z_P$ by referring to the table use of address values i and j each time the pixel data is obtained by scanning by the deflected light. FIG. 5 shows another embodiment, wherein coordinate data is obtained by means of the look-up table. The components, also provided in the embodiment shown in FIG. 1 and not directly concerning the explanation, are not shown. The numeral 19-16 designates an look-up table memory which generates the coordinate values $x_P$ and $z_P$ of the illuminated point, when the X address value and θ address value are supplied from the write control circuit 19-14. The numeral 19-9' designates a profile memory which stores the pixel data generated by the comparator 19-8, wherein the coordinate values $x_P$ and $z_P$ are used as an address.

The content of the profile memory 19-9' indicates the surface profile of the measured object scanned by the laser beam. The memory capacity of the profile memory 19-9' depends on the calculation accuracy of the coordinate values $x_P$ and $z_P$ (i.e., accuracy for profile expression). The profile memory 19-9' is structured as a double buffer memory, similar to the buffer memory 19-9, and the operational condition of the contained memories thereof are alternately switched to writing and reading condition in response to the count-up signal 19-15 generated by the θ address counter 19-13 via the control of the write control circuit 19-14. The above described modification of the embodiment according to FIG. 5 may of course be adopted in the circuit block 20 which processes the pixel signal 10 at the same time, according to the embodiment shown in FIG. 1, so that a look-up table memory 20-16 (not shown) and a profile memory 20-9' (not shown) are provided instead of the buffer memory 20-9. When the CPU 23 receives an interruption of the count-up signal, the CPU 23 supplies the read out command to the read out control circuit 24, and thereby indicates the contents of the profile memory 19-9' and 20-9', or for example, recognizes the vertex of a V-shaped groove of the arc welding work piece by use of the obtained profile data, and then generates the coordinate values to external devices, for example, a robot so as to cause the robot holding the welding torch to carry out the welding work.

Furthermore, according to the principle of triangulation, pair of the coordinate values ($x_P$, $z_P$) and pair of the address values (i, j) (or pair of the light deflection angle $\theta_i$ and the X-coordinate value $x_j$) have a one by one correspondence. Therefore, in general, coordinates for determining the illuminated point on the light receiving elements can be embodied by such coordinates (i, j) or ($\theta_i$, $x_j$). The present invention takes such a standpoint however, only in the case of coordinates values ($x_P$, $z_P$) have been described so as to make the description intuitively understandable.

In fact, there are probabilities of detecting erroneous pixel data due to the inevitable external influences, and dropping of the pixel data due to the weakness of the illuminated point image intensity, whereby the contents of the buffer memories 19-9 and 20-9 and the profile memory 19-9' and 20-9' may includes defects compared with that of the ideal condition. Therefore, it is effective in most cases to execute a pre-processing of the pixel data contained in the buffer memories or the profile memories by the CPU so as to eliminate the undesired data. In this case, preferable kinds of processes may be used according to the specific profile of the measured object and measuring conditions. Furthermore, an actual pre-processing method according to the specific configuration of the CPU 23 may be made such that the processing can be realized by the program control of a general processor, while in the case where rapid processing is required, a circuit-like method may be applied, and other various types of conventional data processing technology can also be applied. The above-described matter can also be applied to shape recognition processing by CPU 23 when this process is required.

Second Embodiment

Figure 6:
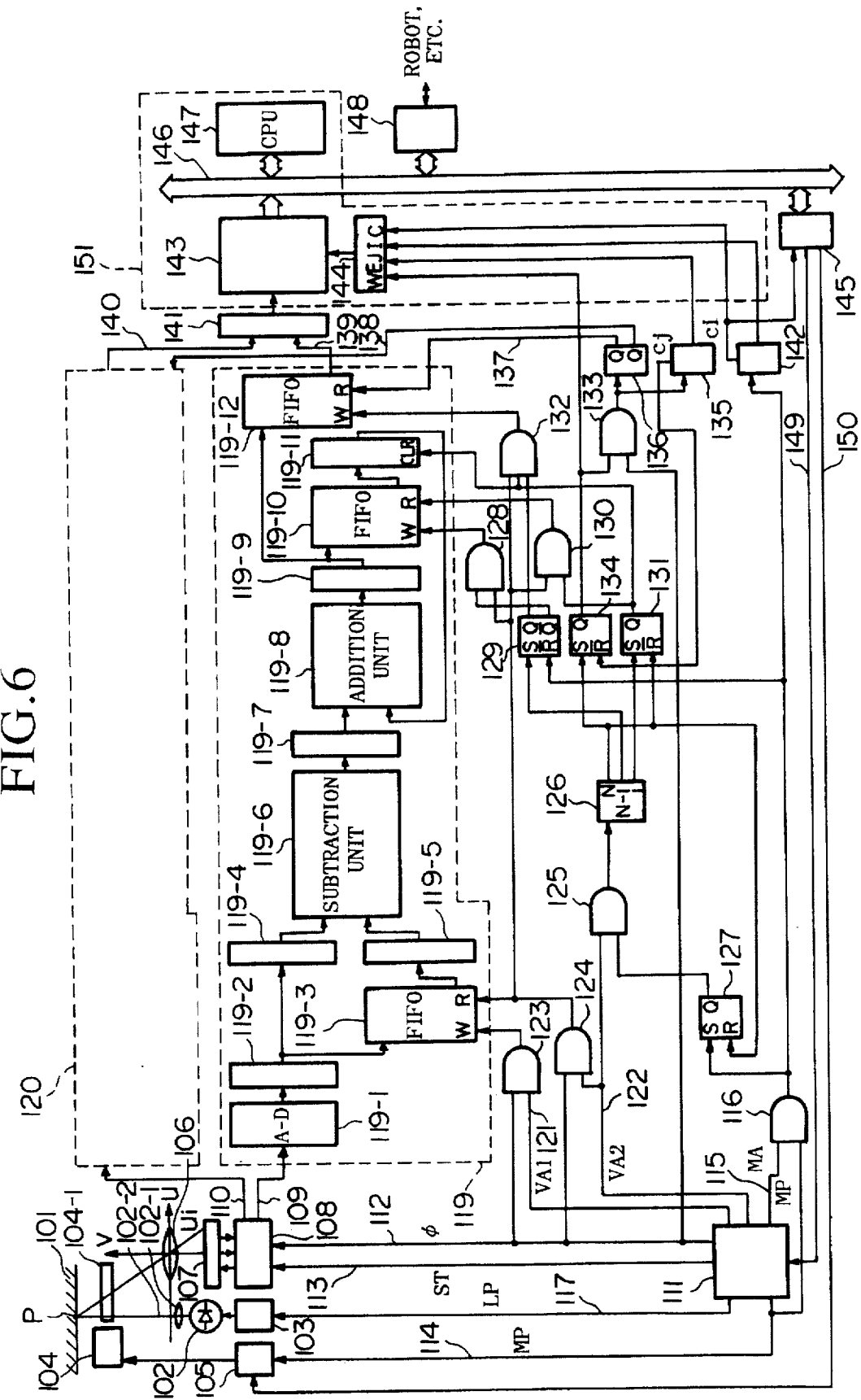
FIG. 6 is a block diagram showing a configuration of object profile measuring apparatus according to a second embodiment of the present invention, wherein a laser beam scans the object surface, the illuminated point thereof is measured by the apparatus, and the object surface profile can thereby be measured.

Next, the second embodiment of the present invention will be described with reference to the drawings. FIG. 6 is a block diagram showing an object profile measuring apparatus according to the second embodiment of the present invention, which senses a point illuminated by a laser beam scanning on the object profile of the measured object. In FIG. 6, 101 designates a profile measured object, 102 designates a laser diode, 102-1 designates a projection lens, 102-2 designates a directed laser beam, 103 designates a laser diode driving circuit, and 104 designates a mirror-type light deflector for deflecting the laser beam, and thereby scans the measured object by the laser beam. The light deflector 104 may be embodied by a galvanometer and other conventional light deflection means such as a motor, the rotation axis thereof being fitted with a mirror. Alternatively, for certain purposes, as in a non-mechanical-type deflector, an acousto-optic light deflector is preferable for its high speed operation in spite of its narrow deflection angle. The numeral 104-1 designates a mirror fitted on the deflector 104, and 105 designates a light deflector driving circuit.

The numeral 106 designates a light receiving lens for sensing the point P illuminated by the laser beam 102-2 which is directed on the object surface via a projection lens 102-1. The numeral 107 designates an array of light receiving elements, which is typically embodied by a CCD linear image sensor, for transforming the illuminated point image into electronic signals. In order to describe the embodiment more specifically, the element 107 shall be considered as an CCD linear image sensor having "128" of effective light receiving elements. Each light receiving element generates a pixel signal which indicates the illuminated point image. The numeral 108 designates a line sensor read-out circuit which generates various types of drive signals to the CCD linear image sensor 107 in order to drive the sensor 107, and amplifies and outputs a read out signal thereof. As an example of the CCD linear image sensor 107, there is adopted a sensor which contains two CCD shift registers which respectively read out stored charges of odd-numbered and even-numbered light receiving elements simultaneously and parallely in order to double the read out speed of the pixel signal. The numeral 109 and 110 respectively designate signals generated by the line sensor read-out circuit 108; more specifically, the former designates a pixel signal for the odd-numbered array of light receiving elements, and the latter designates another pixel signal for an even-numbered array of light receiving elements. In this embodiment, the frequency of the pixel clock signal supplied to the CCD linear image sensor in order to read out the pixel signal is set to "20 MHz".

The apparatus further contains a timing circuit 111 for generating various types of signals in order to operate the object profile measuring apparatus according to the second embodiment. The numeral 112 designates a pixel clock signal φ. 113 designates a linear scanning start signal ST which defines the read out repetition period of the CCD linear image sensor. 114 designates a mirror incremental rotation signal MP which defines a light deflection angle θ$_i$ due to the rotation of the mirror 104-1 fitted to the light deflector 104. The numeral 115 designates a signal MA which indicates an effective light deflection period between a start position of scanning due to the light deflection by the mirror, and its goal position. The signals 112, 113, 114, and 115 are synchronizing with each other. The numeral 116 designates a gate circuit which passes the mirror incremental rotation signal MP during the effective light deflection period indicated by the signal MA. The numeral 117 designates a light emitting signal LP having a predetermined pulse width equal to the laser light emitting period. The laser diode driving circuit 103 receives the light emitting signal 117, and thereby supplies a drive current pulse to the laser diode 102 in order to feed required lighting output. The light deflector driving circuit 105 contains an up-down counter which receives the mirror incremental rotation signal (MP) 114; the circuit 105 generates a triangular drive current and thereby causes a wobble rotation in the mirror 104-1 fitted on the mirror-type light deflector 104, and causes a reciprocation movement of the illuminated point P so as to scan the profile measured object 101. Furthermore, the line sensor read-out circuit 108 receives the pixel clock signal (φ) 112 and linear scanning start signal (ST) 113 and generates various types of drive signal(s) so as to drive the CCD linear image sensor 107.

The numerals 119 and 120 designate circuit blocks which are the major parts of the the present embodiment. The circuit blocks 119 and 120, which respectively receive a read out signal 109 from the odd-numbered array of light receiving elements in the CCD linear image sensor 107 and receives a read out signal 110 from the even-numbered array of light receiving elements in the sensor 107, and senses the picture signal of the illuminated point on the object due to the laser projection by means of eliminating the picture signal from the external light and other various types of obstruction signals, operates as follows. Because the configuration of circuit block 120 is similar to that of the circuit block 119, the detailed configuration of the block 120 will be omitted from the drawings, and description will be made only for the circuit block 119. In the circuit block 119, 119-1 designates an AD converter (i.e., Analog-to-Digital Converter), and 119-2 designates a register. The AD converter 119-1 converts the analog pixel signal 109 to a digital signal of n-bits, where the value of "n" corresponding to the dynamic range value of the utilized pixel signal. Then, the converted signal is stored in the register 119-2.

The numeral 119-3 designates a FIFO (i.e., First-In-First-Out type) memory, which temporarily stores the valid portion of the pixel signals (i.e., 64 pixels), which do not contain laser spot image signals because the laser diode 102 does not illuminate, until the time when the AD converter 119-1 generates the pixel signals of the illumination point due to the illumination by the laser diode 102 in the next linear scanning period. The numerals 121 and 122 designate the valid pixel interval signals VA1 and VA2 which are alternately generated by the timing circuit 111 corresponding to the period of the linear scanning start signals 113 (ST), in order to distinguish the valid interval of the pixel signal without the illuminated point image signal and the valid interval of the pixel signal with the illuminated point image signal appearing therein. The numeral 123 designates a gate circuit, which passes the pixel clock signal 112(φ) during the valid pixel interval signal 121 (VA1) is "ON", and applies the transmitted clock signal to a write control port W of the FIFO 119-3, so that the FIFO 119-3 executes the above-described temporary memory operation.

The numerals 119-4 and 119-5 designate registers, and 119-6 designates a subtraction unit wherein contents of the registers 119-4 and 119-5 are respectively considered as the minuend and the subtrahend, and 119-7 designates a register which holds the output of the subtraction unit. During the next linear scanning period after the above-described temporary memory operation period, the output signal of the AD converter 119-1 during the valid interval of the pixel signal the illuminated point image signal thereof is superimposed with the pixel signals of the background light or the external interference light is supplied to the register 119-4.

Furthermore, simultaneously, data relating to the valid interval of the pixel signal, stored during the previous linear scanning period, during which no illuminated point image signal existed while the signals relating to background light or to external interference light appear, are delayed for one linear scanning period (i.e., 1 H) via the FIFO 119-3 and supplied to the register 119-5. Therefore, the subtraction unit 119-6 generates the difference between the adjacent linear scanning outputs.

Figure 7:
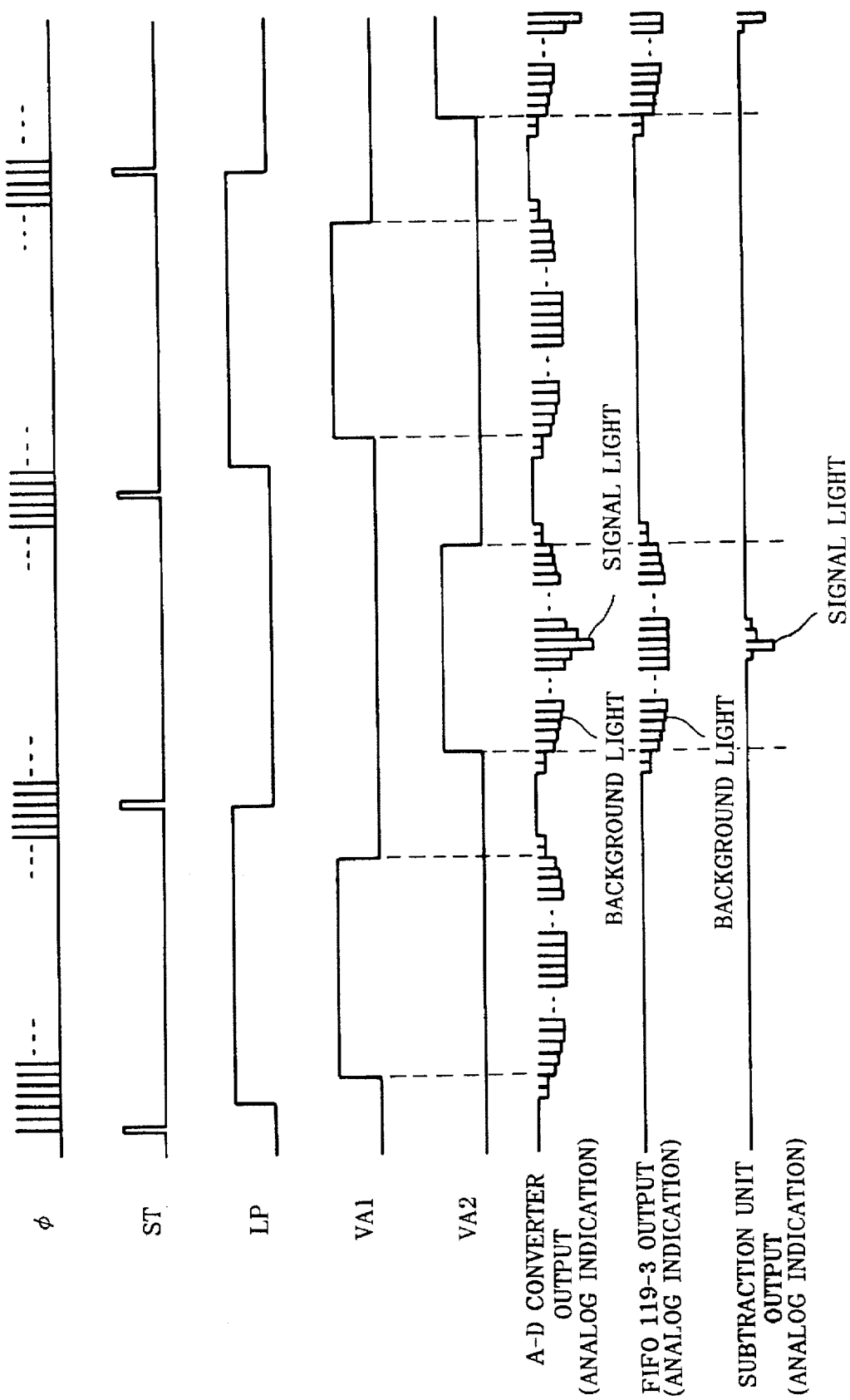
FIG. 7 is a timing chart showing the timing relationship between major signals during illuminated point measuring operation by means of subtracting operation according to the embodiment shown in FIG. 6.

The numeral 124 designates a gate circuit which passes the pixel clock signal 112 (φ) while the valid pixels interval signal 122 (VA2) is in the "ON" status. The transmitted clock signal is supplied to the read out control port R of the FIFO 119-3, so that the read out operation of the "1H" delayed signals to the subtraction unit 119-6 is executed. FIG. 7 shows the timing relationship between the major signals relating to the operation in which the pixel signals of the illuminated point image are sensed by the subtraction operation. As a result of the subtraction operation relating to the period where the valid pixels interval signal 122 (VA2) is "ON", the components of the background light or the external interference light, the fluctuation period of which is much longer than the linear scanning period (i.e., 3.95 µs in the embodiment where the number of "pixels/line" is "79", the number of effective pixels is "64", and the pixel clock frequency is "20 MHz") and which fluctuate less during the linear scanning period, cancel each other between the adjacent linear scanning outputs, whereby only the pixel signal of the illuminated point image and the high-frequency residual components of the external interference light remain.

The high frequency residual components can be reduced by means of averaging the subtraction operation output by repetitive addition. More specifically, outputs of the subtraction unit, which respectively appear corresponding to the light emitting signal LP which appears a plurality of times (i.e., "N" times in this embodiment), are averaged by means of repetitive addition. Next, the latter part of the circuit block 119 for averaging by repetitive addition will be explained.

Figure 8:
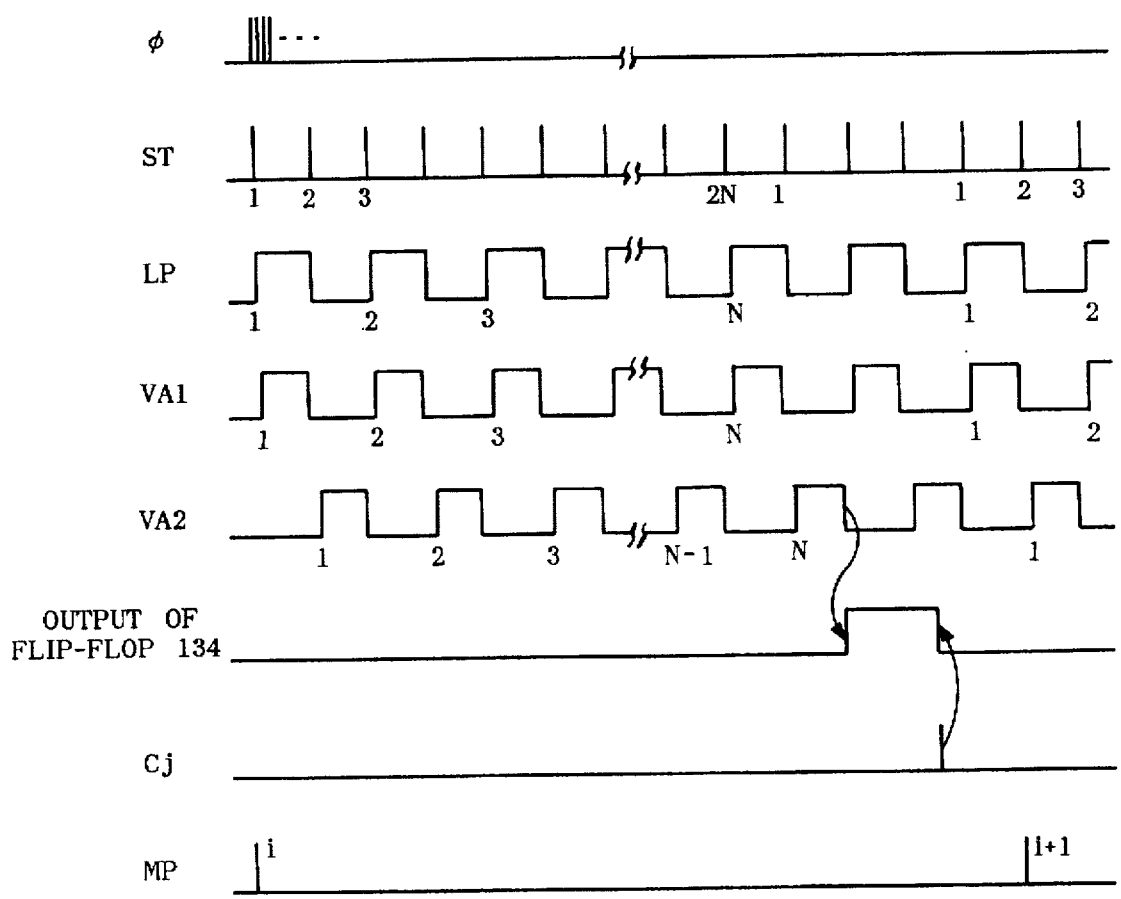
FIG. 8 is a timing chart showing the timing relationship between major signals concerning a read out operation of the image sensor, a mirror deflection operation, and a pulse operation of the laser diode during averaging operation by N-times addition according to the embodiment shown in FIG. 6.

In FIG. 6, 119-8 designates an addition unit, 119-9 designates a register for holding the output of the addition unit 119-8, 119-10 designates a second FIFO memory which temporarily stores the addition results for (N−1) times. The numeral 119-11 designates a register which holds the read out results of the FIFO 119-10, the content of the FIFO 119-10 is fed to the addition unit 119-8 as the summand thereof. The numeral 119-12 designates a third FIFO which temporarily stores the N-th addition results. Among the "N"

of the valid pixels interval signals 122 (VA2) which are sequentially generated just after the i-th effective mirror incremental rotation signal MP is generated during the period where the effective light deflection period signal MA is "ON", the contents of the register 119-11 (i.e., the summand) is initialized (i.e., the value is "0") in the period of the first signal VA2. In this period, the FIFO 119-10 will not be read out, and as the first addition results, the content of the register 119-7 are supplied as is to the register 119-9, and temporarily memorized in the FIFO 119-10.

The repetitive addition operations after 2nd stage are executed such that the previous addition results stored in the FIFO 119-10 are supplied to the register 119-11 as the summand, the summand and the contents of the register 119-7 which indicates the new subtraction results as the addend are supplied to the addition unit 119-8, and the addition results thereof are supplied to the FIFO 119-10 via the register 119-9, and thereby renew the addition results.

In the N-th addition, the addition results are stored in the FIFO 119-12, not in the FIFO 119-10. This is because, the N-th addition will be read out as the output of the odd-numbered light receiving elements wherein the interference components will have been eliminated. In order to realize the above-described addition operation, the generation means of the clock signal which is supplied to the FIFOs 119-10 and 119-12 and the register 119-11 will be described below with reference to FIG. 6.

The numeral 125 designates a gate circuit which passes the valid pixels interval signal (VA2) 122 when the incremental rotation signal for the mirror (MP) 114 just appears, while the circuit 125 obstructs the signal 122 after N of the incremental rotation signal for the mirror (MP) have passed. The numeral 126 designates a counter circuit which generates a count signal every time when the first, (N−1)-th or N-th valid pixels interval signal VA2 is counted. The numeral 127 designates an RS flip-flop circuit, the output signal Q thereof is supplied to the gate circuit 125 as its gate control signal. The output status of the flip-flop circuit 127 is set to the high-level (i.e., "1") by the incremental rotation signal for the mirror (MP) 114, while reset to low-level (i.e., "0") by the count output from the counter circuit 126 corresponding to the N-th valid pixels interval signal (VA2).

The numeral 128 designates a gate circuit, 129 designates a RS flip-flop circuit which utilizes the counter output signal of count number (N−1) from the counter circuit 126 as the "set" input signal (S), utilizes the incremental rotation signal for the mirror (MP) via the gate circuit 116 as the "reset" input signal (R), controls the gate circuit 128 according to negative logic output $\bar{Q}$ thereof, passes output of the gate circuit 124 concerning to the first to the (N−1)-th valid pixel interval signal (VA2), and thereby supplies the clock signal to the write control port W of the FIFO 119-10. As a result, only the addition results relating to the first to (N−1)-th can be stored in the FIFO 119-10. The numeral 130 designates a gate circuit, 131 designates an RS flip-flop circuit which utilizes the first count output signal of the counter circuit 126 as the "set" input signal and utilizes the count output signal corresponding to the N-th input signal as the "reset" input signal. The output signal of the circuit 131 is supplied to the clear port (CLR) of the register 119-11 and to the gate circuit 130 as the control signal thereof. Accordingly, the register 119-11 maintains its status as "clear" at the first addition, and controls the pass of the output signal of the gate circuit 124 in the gate circuit 130.

The output signal of the gate circuit 130 is utilized as a clock signal which is supplied to the read out control port R of the FIFO 119-10 in order to read out the first to the (N−1)-th addition results from the FIFO 119-10 so as to respectively execute the second to the N-th additional operation by the adder 119-8. The numeral 132 designates a gate circuit which generates a clock signal to be supplied to the write control port W of the FIFO 119-12, in order to make the FIFO 119-12 store the N-th addition results therein, by controlling the pass of output of the gate circuit 124. The outputs of the RS flip-flop circuits 129 and 131 as the gate control input allows only the clock signal relating to the N-th valid pixels interval signal (VA2) to pass the circuit 132.

The numeral 133 designates a gate circuit, 134 designates a RS flip-flop circuit, the "set" input signal thereto is the count-up output signal of the counter circuit 126 corresponding to the N-th input. The numeral 135 designates a pixel address counter which counts up the outputs of the gate circuit 133, and outputs the arrangement position number j of the light receiving element corresponding to the addition result under reading out operation as the count results. The counter 135 generates a count-up signal $C_j$ and thereby resets the RS flip-flop circuit 134 when the counter 135 counts up the input signals the number of which is equal to the total number of the effective light receiving elements (i.e., "128" in this embodiment) contained in the odd and even numbered CCD linear image sensor 107. FIG. 8 shows relationship between the major signals among above-described ones.

The gate circuit 133 utilizes the output signal of the RS flip-flop circuit 134 as the control input, and controls the pass of the pixel clock signal ($\phi$) 112. When the N-th addition results are stored in FIFO 119-12, the circuit 133 immediately starts the generation of a clock signal for generating the read out clock signals which are supplied to the read out control port R of FIFO 119-12 so as to read out the contents thereof.

The numeral 136 designates a flip-flop circuit which receives the pixel clock signal from the gate circuit 133, and thereby generates two clock signals, the repetition frequency thereof being half of the pixel clock signal, and the phases thereof differ by a half period from one another, from output ports Q and $\bar{Q}$. The numerals 137 and 138 designate clock signals generated by the flip-flop circuit 136. The numerals 139 and 140 designate the N-th addition results respectively read out by the circuit blocks 119 and 120. The numeral 141 designates a register which stores the addition results 139 and 140. The clock signal 137 is supplied to the read out control port R of the FIFO 119-12 of the circuit block 119, which processes the pixel signal of the odd-numbered light receiving elements. Similarly, the clock signal 138 is supplied to the read out control port R of the FIFO, which corresponds to the FIFO 119-12, of the circuit block 120, which processes the pixel signal of the even-numbered light receiving elements. As a result, the N-th addition results of the circuit blocks 119 and 120 are alternately generated as the output signals 139 and 140. The numeral 142 designates a deflection address counter which counts up the mirror incremental rotation signal MP during the effective light deflection period, and thereby generates its count value i as the deflection address of an illuminated point P corresponding to the light deflection angle $\theta_i$.

The numeral 143 designates a pixel data memory which stores the results ($I_{ij}$) of the averaging by repetitive addition, and is composed as a double buffer type memory. The numeral 144 designates a write control circuit of the memory 143. The output of the RS flip-flop circuit 134 in its "set" condition opens the gate circuit 133 and thereby begins the read out of the results of the "N" times addition, and is further supplied to the write control port WE of the write control circuit 144 so as to enable the writing operation of the addition results in the register 141 to the pixel data memory 143. Simultaneously, a pair of count values (i, j), relating to the deflection address counter 142 and the pixel address counter 135, is supplied to address input ports I and J as an address of the averaged results by repetitive addition ($I_{ij}$) on the pixel data memory 143. According to the embodiment, the addition times "N" is set as $N=2^q$. Therefore, when the addition results in the register 141 is to be stored in the pixel data memory 143 as the averaged repetitive addition results ($I_{ij}$), there is no need for executing the division by N; by only shifting the read out position of register 141 by q-bits, the averaged results ($I_{ij}$) can be obtained. The difference between the addition results and the averaged result is important for designing of the operation circuit at its digit number, whereas this is not as essential for the object of the present invention.

The numeral 145 designates a system control interface circuit, 146 designates a system bus, 147 designates a CPU, and 148 designates an input-output interface circuit. The deflection address counter 142 outputs the count-up signal $C_i$ when the counter 142 counts up the mirror incremental rotation signal MP during the effective light deflection period to a predetermined maximum value. The count-up signal $C_i$ indicates that one scanning of the profile measuring object 101 by the light spot P is completed. When the signal $C_i$ is supplied to the memory bank alternation control port C of the write control circuit 144, one of the memory planes of the pixel data memory 143 having a double-buffer configuration, which has been utilized for data writing, will be switched to a reading out condition, while the other memory plane will be switched to the writing condition so as to prepare the subsequent writing operation relating to the subsequent repetitive addition value in the subsequent scanning due to the light deflection. Further, the count-up signal $C_i$ is supplied to the system control interface circuit 145, and thereby sent to the CPU 147 via the system bus 146. The CPU 147 thereby acknowledges the termination of one scanning due to the light deflection and which plane to be read out between the two planes of the pixel data memory.

The CPU 147 reads out the content of the pixel data memory 143 at address (i, j) (wherein j=1, 2, . . . 128), and obtains the pixel signal ($I_{ij}$) (i.e., the averaged value of the pixel data by repetitive addition) of the illuminated points P corresponding to the light deflection angle $\theta_i$. In order to determine the three-dimensional position of the illuminated point P by the triangulation method, the center position of the distribution of pixel signals on the CCD linear image sensor 107 must be obtained. The center position is obtained as a centroid. The centroid $j_{gi}$ relating to the pixel address (i, j) is obtained as follows;

$$j_{gi} = \Sigma j \times ((I_{ij}) - T_{ij}) / (\Sigma ((I_{ij}) - T_{ij})) \tag{1}$$

In formula (1), the operator "Σ" means to accumulate the value ($I_{ij}$)–$T_{ij}$ only in the case where ($I_{ij}$)–$T_{ij}$>0". The value "i" is corresponding to the illuminated point P having the light deflection angle $\theta_i$, where the angle $\theta_i$ is renewed by the mirror incremental rotation signal MP during the effective light deflection period. In this embodiment, a total of "256" centroids of the illuminated points corresponding to the value "i" from "i=1" to "i=256" are calculated by the above formula (1). $T_{ij}$ designates a threshold value which is previously set corresponding to the profile of the measured object; that is to say, corresponding to the track of the illuminated point P, in order to eliminate the external interference light and the general noise components due to the circuit noise, etc., and to eliminate the stray light components which are directed to improper positions on the light receiving elements due to the multiple reflection of the directed laser beam incident on the profile measured object 101, etc. The threshold value $T_{ij}$ is set to a satisfactorily large value which satisfies the relation ($I_{ij}$)–$T_{ij}$<0 in the area where the illuminated point does not appear and is thereby excluded from the calculated object, while the value $T_{ij}$ is set to a suitable value which satisfies the relation ($I_{ij}$)–$T_{ij}$>0 so as to eliminate the noise components in the other areas.

For example, as the illuminated point diverges from the optical axis of the light receiving lens 106, the focusing position on the array of light receiving elements relating to the illuminated point diverges from the optic axis and would not be close to the optical axis. In such cases, address areas around the optic axis are excluded from the calculation object, so that the threshold value $T_{ij}$ thereof is set to a satisfactorily large value. Such areas excluded from the calculation object can be approximately estimated if the approximate profile of the measured object 101 or type of the profile are previously known. Furthermore, even though the process is limited to the areas where the illuminated point should not exist in order to avoid the danger of eliminating the real illuminated point, a certain elimination effect can be obtained concerning the noise components and stray light. In other words, if the excluded area is previously calculated as correctly as possible and the maximum area is set as the excluded area, a more satisfactory elimination effect can be obtained.

Incidentally, according to the above description, the thresholding was made for average representation of repetitive addition. However, it can be embodied such that the contents of the register 141 are set to the "N" times addition results, thresholding the addition results, and the thresholding result is picked up by the register 154 where the read out position of the register 154 is shifted "q" bits (only if $N=2^q$), whereby the average representation of repetitive addition after the thresholding can be finally obtained. Furthermore, according to the above description, elimination of the noise components and stray light have been executed indirectly by means of thresholding the pixel signal value. However, it can also be embodied by a direct thresholding such that pixel signal ($I_{ij}$) relating to the appeared pixel address j is picked up as the calculation object when the pixel address j satisfies the relation $j_{i1}<j<j_{i2}$ in which the $j_{i1}$ and $j_{i2}$ respectively designate the upper and lower limits of the illuminated point appearance area, while other pixel signals are excluded from the calculation object. In this case, thresholding will be executed for the pixel address.

Therefore, coordinates $u_i$ in the real space relating to the illuminated point image on the CCD linear image sensor 107 is given by the following formula (2).

$$u_i = u_o + k \times j_{gi} \tag{2}$$

In the formula (2), $u_o$ designates a constant, k designates the arrangement pitch between the light receiving elements. Next, description will be given for a method to obtain the coordinate ($x_i$, $z_i$) of the illuminated point P on the profile measured object 101 by means of the coordinate $u_i$.

Figure 9A:
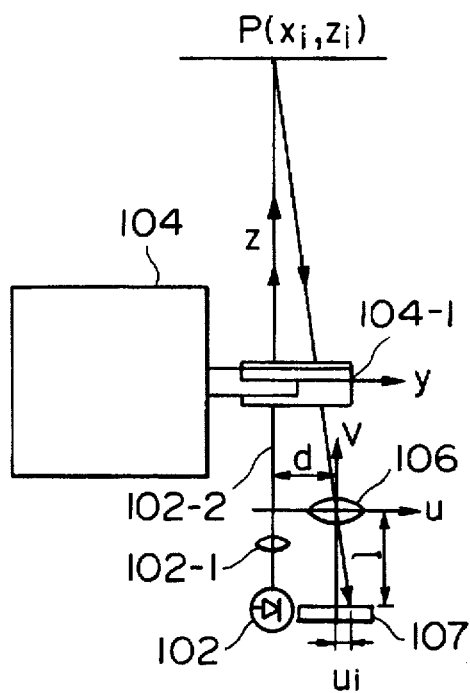
FIGS. 9 (a)–(c) are drawings showing the configuration of the optical unit of a normal object profile measuring apparatus and the calculation principle for coordinating the laser irradiation point.
Figure 9B:
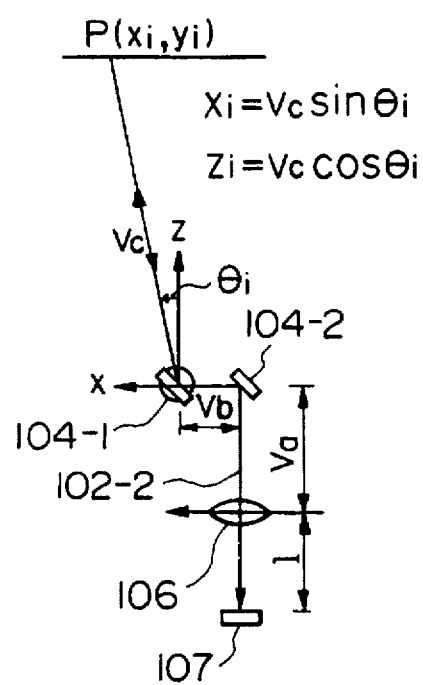
Figure 9C:
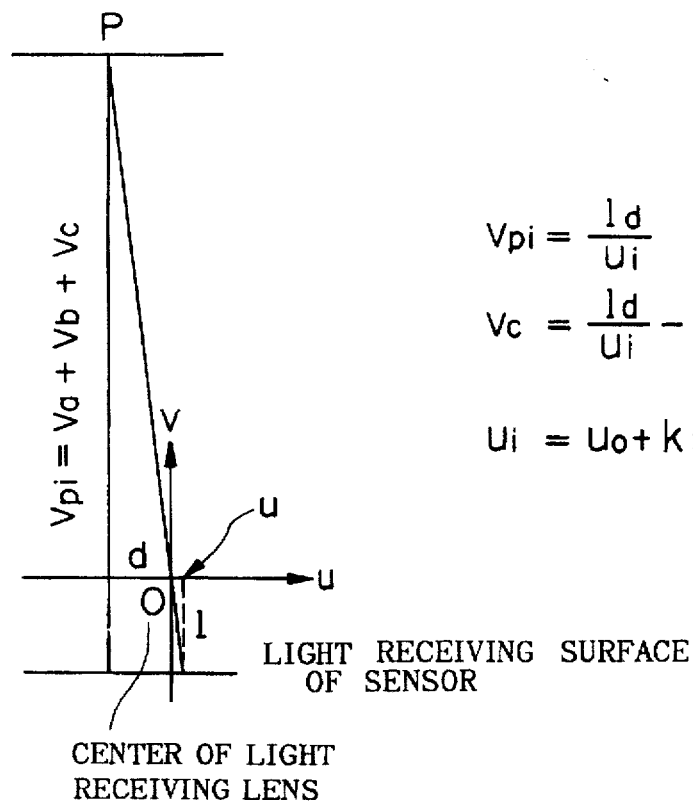

FIG. 9 (a) to (c) show detailed composition of the optical units around the mirror-type light deflector 104 according to the embodiment.

In FIG. 9 (a), there is shown the distance l between the light receiving lens 106 and the CCD linear image sensor 107, the distance d between the axis of directed laser beam 102-2 and optical axis of the light receiving lens 106, the coordinate axis y which coincides with the rotation axis of the mirror 104-1, coordinate axis u which passes through the center of light receiving lens 106 and vertically crosses with the optical axis, and vertical coordinate axis v which coincides with the optical axis of the light receiving lens 106. In this embodiment, the center axis of the directed laser beam 102-2, optical axis of the light receiving lens 106 and the coordinate axes u and v are located on a common plane, the coordinate axis y is parallel to the coordinate axis u, and the center axis of the directed laser beam 102-2 is parallel to the optic axis of light receiving lens 106, in order to simplify the explanation. FIG. 9 (b), which is the side view of FIG. 9 (a), shows the situation wherein fixed mirror 104-2 for alternating the light path is located between the optical lens 106 and rotating mirror 104-1 in order to direct the laser beam 102-2 into mirror 104-1 at a suitable angle.

FIG. 9 (b) further shows the coordinate axes x and z in the paper surface, which compose the Cartesian coordinates with the coordinate axis y which coincide with the rotation axis of the mirror 104-1 (see FIG. 9 (a)), and optical path lengths $v_a$, $v_b$, $v_c$ which respectively designate the length between the light receiving lens 106, the fixed mirror 104-2, the rotating mirror 104-1, and the illuminated point P. FIG. 9 (c) shows, in an arrangement condition of FIG. 9(b), a drawing of equivalent path length in order to calculate the entirety path length $v_{pi}$ from the u axis of the light receiving lens 106 to the illuminated point P along with the directed laser beam 102-2. According to FIG. (c), the entirety of the optical path length $v_{pi}$ can be obtained by following formula (3) according to the triangulation principle.

$$v_{pi} = 1 \cdot d/u_i \quad (3)$$

Therefore, optical path length $v_c$ ($=v_{pi}-v_a-v_b$) from the rotating axis of mirror 104-1 (i.e., y axis) to the illuminated point P, can be obtained by the following formula (4).

$$v_c = 1 \cdot d/u_i - (v_a + v_b) \quad (4)$$

Furthermore, the light deflection angle $\theta_i$ can be obtained by the following formula (5).

$$\theta_i = \theta_o - \Delta\theta \times i \quad (5)$$

Wherein i designates a count value of the deflection address counter 142, $\Delta\theta$ designates an incremental constant of deflection angle, $\theta_o$ designates the initial value (i.e., constant) of the deflection angle.

Therefore, coordinates ($x_i$, $z_i$) relating to the illuminated point P in the deflected scanning plane of the directed laser beam 102-2 (in other words, the x-z plane) can be obtained by the following formulae (6) and (7) in accordance with FIG. 9 (b).

$$x_i = v_c \times \sin\theta_i \quad (6)$$

$$z_i = v_c \times \cos\theta_i \quad (7)$$

The above-described calculations relating to the image center $j_{gi}$, ($u_i$ in the physical space coordinates) of the illuminated point P and the coordinate ($x_i$, $z_i$) of the illuminated point P, which traces the surface of profile measuring object 101, can be executed by the CPU 147. The numeral 149 designates a sensing start signal. Referring to FIG. 6, the CPU 147 supplies the sensing start signal 149 to a timing circuit 111 via the system control interface circuit 145 so as to start the above-described sensing operation of the image signal relating to the illuminated point P. The CPU 147 reads out the image signal relating to the illuminated point P from the pixel data memory 143 via the system bus 146 when the CPU 147 receives the count-up signal $C_i$ from the deflection address counter 142 via the system control interface circuit 145, and thereby calculates the coordinate ($x_i$, $z_i$) of the illuminated point by means of the above described program operation. The series of coordinates ($x_i$, $z_i$) (where i=1, 2, . . . , 256) relating to the illuminated point P, which is obtained by one scanning due to the light deflection, indicates the surface profile of the measured object 101 in the scanning plane, in other words, indicates the sectional profile.

Even though the object of the present invention can be achieved by the above-described operation, the embodiment is widely applicable. For example, in the case where a corner consisting of two steel plates is seamed by arc welding, the L-shaped profile of the corner can be measured by the profile measuring apparatus according to the present invention, and the profile data thereof can be processed by a computer, and thereby the welding position of the corner edge can be determined. When the welding position is determined, the position data is transferred to external devices from the input-output interface circuit 148. For example, if the data is transferred to a robot which holds the welding torch, the robot carries the welding torch to the indicated welding position and thereby executes welding work accurately. Therefore, if the profile measuring apparatus is equipped with the robot together with the welding torch, moves along with the seam line, and continuously measures the sectional profile which vertically crosses the seam line relating to the object by means of repetitive scanning, the position of the welding torch can be led, along with the seam line accurately, whereby automation of the robot arc welding can be achieved.

Incidentally, the coordinate values ($x_i$, $z_i$), pair of coordinates $u_i$ (or $V_c$) and angle $\theta_i$, and pair of the image center jgi and the counted value i have a one by one correspondence. Therefore, in general, coordinates for determining the illuminated point on the light receiving elements can be embodied by such pairs. The present invention takes such a standpoint however, only in the case of coordinates values ($x_i$, $z_i$) have been described so as to make the description intuitively understandable.

The CPU 147 is able to execute the above described coordinate calculation, shape recognition processing, and communication with external devices, as well as total managing and control of the overall profile measuring apparatus such as initializing of the component before the operation thereof, status monitoring during the operation, and the like. The numeral 150 designates light deflection operation constants relating to the mirror-type light deflector 104, which are supplied to the light deflector driving circuit 105 from the CPU 147 via the system control interface circuit 145. The constants 150 contain the one which determines the initial light deflection angle $\theta_o$, the light deflector drive current amplification gain constant which determines the deflection angle incremental value $\Delta\theta$, and the maximum count value of the up-down counter corresponding to the mirror incremental rotation signal MP. The light deflection operation constants 150 will be obtained at the initializing of the apparatus of course; furthermore, the constants 150 can be obtained as the modification data of the constants in accordance with a shape measurement procedure which is previously set to the CPU 147 as a program thereof or externally fed during the measurement.

One advantage of modifying the light deflection operation constants during the measurement is to eliminate needless light deflection scanning and thereby improve measurement efficiency. For details, in the starting process of the sequential profile measurement, the light deflection operation constants 150 is set so as to obtain the profile data in wide areas. For example, the constants 150 are determined so as to set the number of the deflection points during the effective light deflection period to "256" in a manner similar to that in the above-described embodiment, to find the area, where the profile measurement is continuously executed, using the obtained profile data from the wide areas, and to modify the light deflection operation constants so as to execute the scanning due to the light deflection relating to "128" of effective deflection points only corresponding to the specific measurement areas, more specifically, to minimize the maximum count value of the up-down counter. According to the modification of the light deflection operation constants 150, when the maximum count value of the up-down counter is changed, the effective light deflection period will be changed accordingly as described below. Therefore, although FIG. 6 does not show the details, the CPU 147 supplies a control signal to timing circuit 111, and changes the pulse width and appearance timing of signal (MA) 115 which indicates the effective light deflection period to appropriate values in order to send only the required number of mirror incremental rotation signals MP via the gate circuit 116.

In addition, count-up value $C_i$ of the deflection address counter 142 is reoriented in accordance with the total number of the mirror incremental rotation signals MP which pass the gate circuit 116. According to the embodiment, although FIG. 6 does not show the details, the operator of the object profile measuring apparatus can instruct the number of addition times "N" via ordinary or specially ordered computer input/output devices. The CPU 147 sets the count-up values N and N−1 of the counter circuit 126 corresponding to the instructed number of addition times "N". In this case, the number of light emitting signals LP between two adjacent mirror incremental rotation signals MP increases or decreases corresponding to the number of addition times N. Therefore, the appearance interval of the mirror incremental rotation signal MP shall be adjusted accordingly. This interval can be also controlled by supplying control signals from the CPU 147 to the timing circuit 111.

Figure 10:
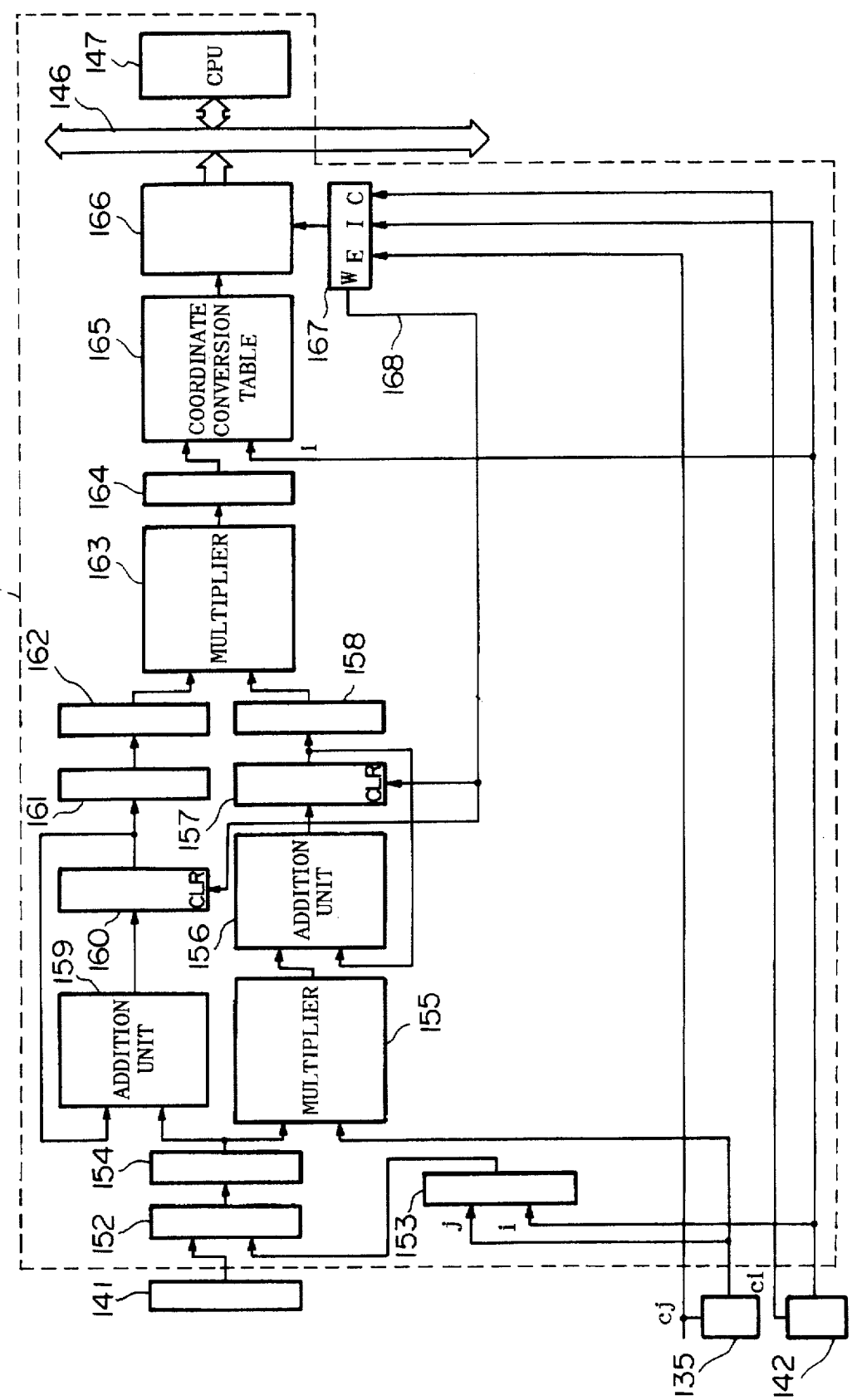
FIG. 10 is a block diagram showing a partial configuration of an object profile measuring apparatus according to the second embodiment of the present invention, wherein coordinates are calculated by means of an addition unit, a multiplier, and a coordinate conversion table.
Figure 11:
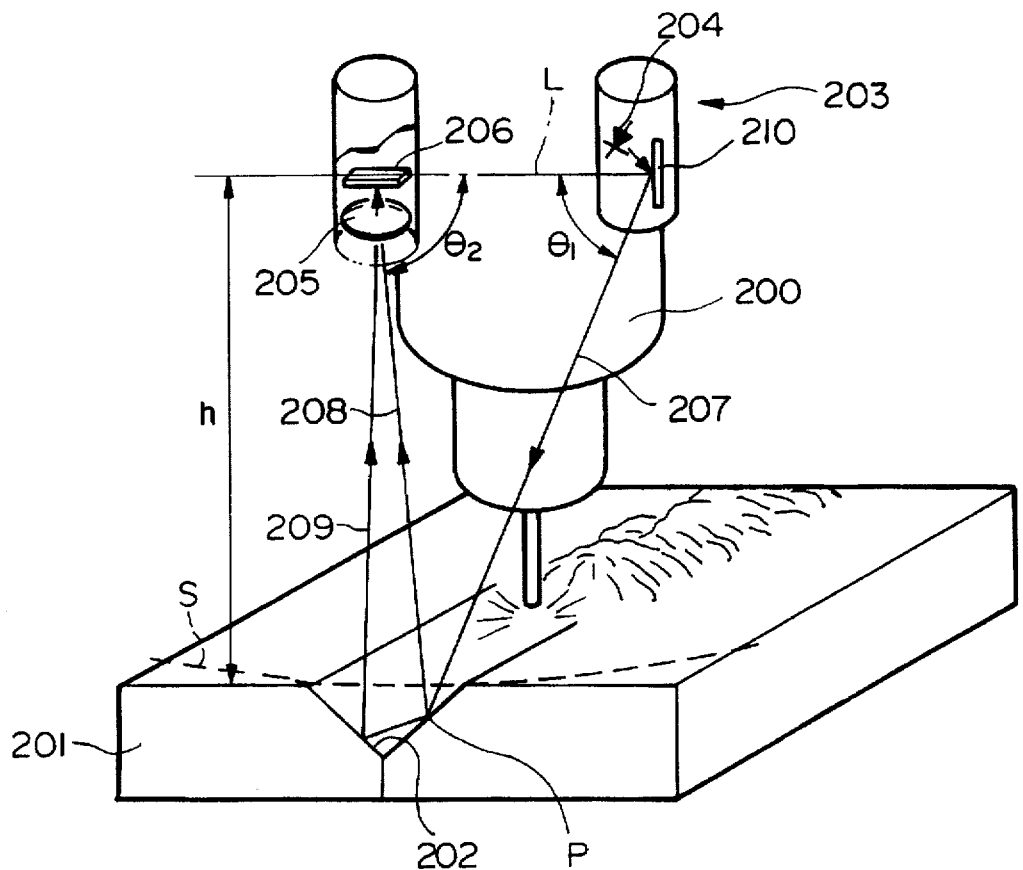
FIGS. 11 and 12 are perspective views of conventional object profile measuring apparatuses.
Figure 12:
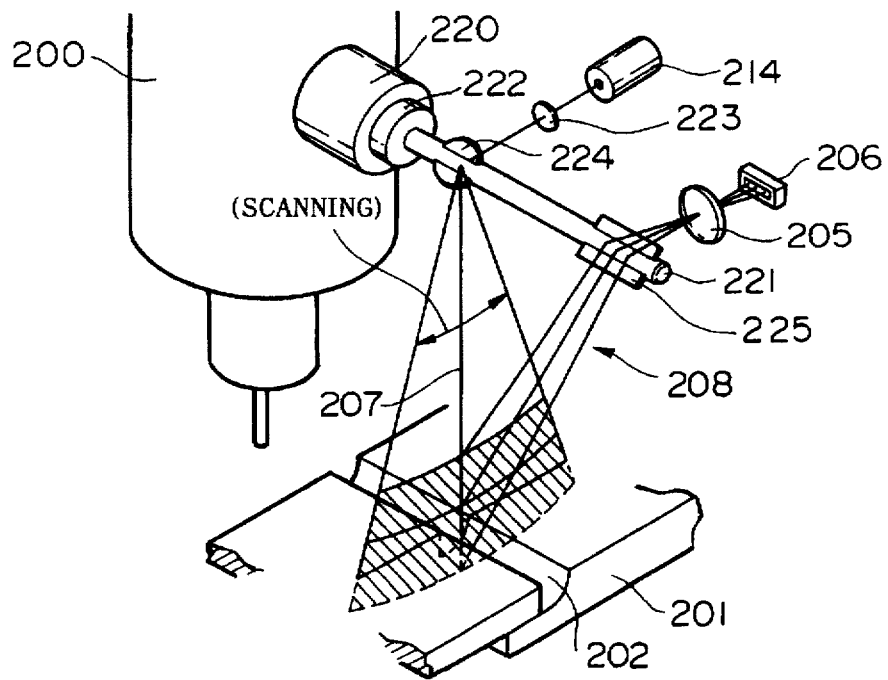

The embodiment which executes the program processing in order to obtain the series of coordinates $(x_i, z_i)$ (where i=1, 2, . . . , 256) relating to the illuminated point P have been described above; however, this process can of course be embodied by a hardware which utilizes operation circuits. In FIG. 6, 151 designates a circuit block (which is enclosed by a broken line) in order, to execute the above described program processing. If the operation circuits are introduced to this part, the above described coordinates calculation can be rapidly executed. FIG. 10 shows a partial block diagram of the embodiment which corresponds to the circuit block 151 in FIG. 6, utilizes addition units, multipliers and a coordinates conversion table, and thereby calculates the coordinates of the illuminated point. The details of circuit operation thereof shall be described below.

The numeral 152 designates a digital comparator, 153 designates a threshold value table which stores the threshold values $T_{ij}$ (where i=1, 2, . . . , 256; j=1, 2, . . . , 128). When the averaged repetitive addition value $(I_{ij})$ generated by the register 141 and the threshold value $T_{ij}$ generated by the threshold value table 153 are respectively supplied to the digital comparator 152, the comparator 152 generates the value $(I_{ij})-T_{ij}$ when it is a positive value, and the generated value is stored in the register 154. The read out operation concerning the threshold value $T_{ij}$ is executed by accessing the threshold value table 153, wherein the counted value i generated by the deflection address counter 142 and the counted value J which is generated by the pixel address counter 135 are considered as the address.

The above described operation is corresponding to the elimination means of the noise components based on the thresholding of pixel signal value and the stray light, and a composition based on the thresholding pixel address of the pixel signal can be also embodied. For example, the comparator 152 is operated by a fixed threshold value $T_h$ (i.e., the output is the positive values of $(I_{ij})-T_h$) for eliminating the noise component, provided with a pixel address comparator, which compares the pixel address with addresses $j_{i1}$ and $j_{i2}$ ("256" pairs of i=1, 2, . . . , 256 are required in this embodiment) of a boundary pixel of the area wherein the illuminated point image does not appear, instead of the threshold value table 153. The pixel address comparator outputs a binary value of "high" or "low" corresponding to the input pixel address (i, j), thereby controls the register 154. More specifically, the comparison output is supplied to the clear port thereof and controls whether or not the register 154 holds the output of the digital comparator 152.

First, the operation of centroid calculation part will be described. The numeral 155 designates a multiplier, 156 designates an addition unit, 157 and 158 respectively designate registers. When the multiplication results $j \times ((I_{ij})-T_{ij})$ of the counted value j of the pixel address counter 135, and the averaged repetitive addition value $((I_{ij})-T_{ij})$ which have been practiced by the thresholding and have been stored in the register 154, are sequentially supplied by the multiplier 155 to the addition unit 156, the accumulated value $\Sigma j \times ((I_{ij})-T_{ij})$ thereof is temporarily stored in the registers 157 and 158. On the other hand, 159 designates an addition unit, 160 designates a register, 161 designates a reciprocal table which generates a reciprocal number which is previously calculated and stored corresponding to the input value. The numeral 162 designates a register. When the averaged repetitive addition values $(I_{ij})-T_{ij}$ which have been practiced by the thresholding are sequentially supplied to the addition unit 159, the accumulated value $\Sigma((I_{ij})-T_{ij})$ thereof is supplied to the register 160. When the accumulated value $\Sigma((I_{ij})-T_{ij})$ which was temporarily stored in the register 160 is supplied to the reciprocal table 161, the reciprocal number $((\Sigma((I_{ij})-T_{ij}))^{-1})$ thereof is generated and stored in the register 162.

Further, 163 designates a multiplier, and 164 designates a register. The accumulated value $\Sigma j \times ((I_{ij})-T_{ij})$ stored in the register 158, and the reciprocal number $(\Sigma((I_{ij})-T_{ij}))^{-1}$ of the accumulated value stored in the register 162 are supplied to the multiplier 163, and whereby a multiplication results $\Sigma j \times ((I_{ij})-T_{ij})(\Sigma((I_{ij})-T_{ij}))^{-1}$ which is equal to the centroid $j_{gi}$ (see formula (1)) is obtained in the register 164.

Next, circuit operation for obtaining the coordinate $(x_i, z_i)$ of the illuminated point P will be described. The numeral 165 designates a coordinates conversion table, and 166 designates a illuminated point coordinate memory. According to the relationship relating to the above described formulae (2) to (7), when the centroid $j_{gi}$, deflection address i, and coefficients $u_o$, k, l, d, $v_a$, $v_b$, $\theta_o$, and $\Delta \theta$ are obtained, the coordinates $(x_i, z_i)$ of the illuminated point P can be uniquely determined. The coordinates conversion table 165 which utilizes such a relationship and stores illuminated point coordinates $(x_i, z_i)$ previously calculated relating to the all combination of $(i, j_{gi})$, receives the centroid address $j_{gi}$ stored in the register 164 and the counted value i of the deflection address counter 142, and generates the corresponding illuminated point coordinates $(x_i, z_i)$. The writing operation of the illuminated point coordinate $(x_i, z_i)$ to the illuminated point coordinate memory 166 is executed as follows.

The numeral 167 designates a write control circuit of the illuminated point coordinate memory 166. When the pixel address counter 135 counts the pixel clock signal during the effective pixel period relating to the one line scanning up to the maximum value (i.e., "128" in the present embodiment), the circuit 135 outputs the count-up signal $C_j$ and supplies it to the write control port WE of the write control circuit 167 so as to enable writing. The circuit 167 further supplies the coordinate calculation results from the coordinate conversion table 165 is stored in the illuminated point coordinate memory 166, wherein the counted value i of the deflection address counter 142 supplied to the address port I is utilized as the memory address. The numeral 168 designates a register clear signal. The write control circuit 167 supplies the register clear signal 168 to clear ports CLR of registers 157 and 160 every time each illuminated point coordinate $(x_i, z_i)$ is stored in the illuminated point coordinate memory 166, whereby registers 157 and 160 are cleared so as to prepare for the next centroid calculation.

The illuminated point coordinate memory 166 is composed as a double buffer type memory as well as the pixel data memory 143, the operational condition of the contained memories thereof are alternately switched to writing and reading condition in response to the count-up signal $C_i$ which is supplied from the deflection address counter 142 to the memory bank switching control port C of the write control circuit 167. Therefore, scanning due to the light deflection are repeated, the new profile data relating to the profile measuring object 101 is continuously obtained. The CPU 147 can execute data processing and data transmission for the external devices as similar to the embodiment in FIG. 6, wherein the data processing is, for example, such that when CPU 147 receives the interruption due to the count-up signal $C_1$ via the system control interface circuit 145 (see FIG. 6), the CPU 147 reads out the contents of the illuminated point coordinate memory 166, senses the vertex of the V-shape of the arc welding part which has a V-shaped groove, for example.

Further, in an actual situation, there are probabilities of detecting an erroneous pixel data due to the inevitable external influences, and dropping of the pixel data due to the weakness of the illuminated point image, whereby the contents of the illuminated point coordinate memory 166 are too likely to be erroneous compared with that in the ideal condition. Therefore, it is effective for most cases to execute a pre-processing to the coordinate data contained in the illuminated point coordinate memory 166 by the CPU so as to eliminate the undesired data and compensate the dropped data. In this case, a preferable kind of processes may be determined due to the specific profile of the measuring object and measuring conditions. Further, a realizing method of the pre-processing is due to the specific configuration of the CPU 147 such that the processing can be realized by a program control of a general-purpose processor, while in the case where rapid processing is required, a circuit-like method may be also applied, if necessary, to shape recognition processings by CPU 147, wherein geometrical features such as the vertex of a V-shaped groove and the slope of a profile line are sensed.

Figure 13A:
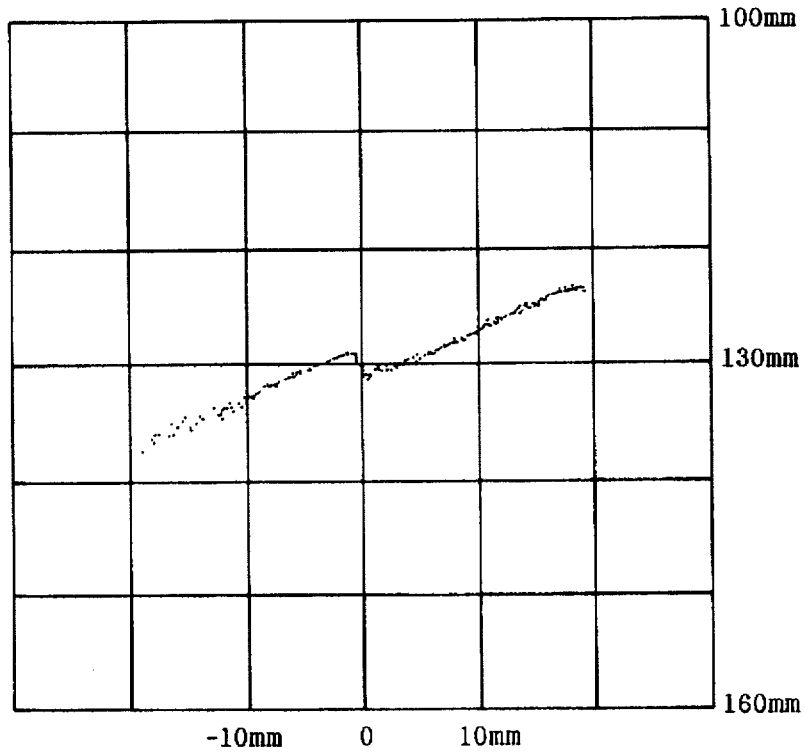
FIGS. 13(a) to (i) are drawings showing experimental results according to the second embodiment of the present invention.
Figure 13B:
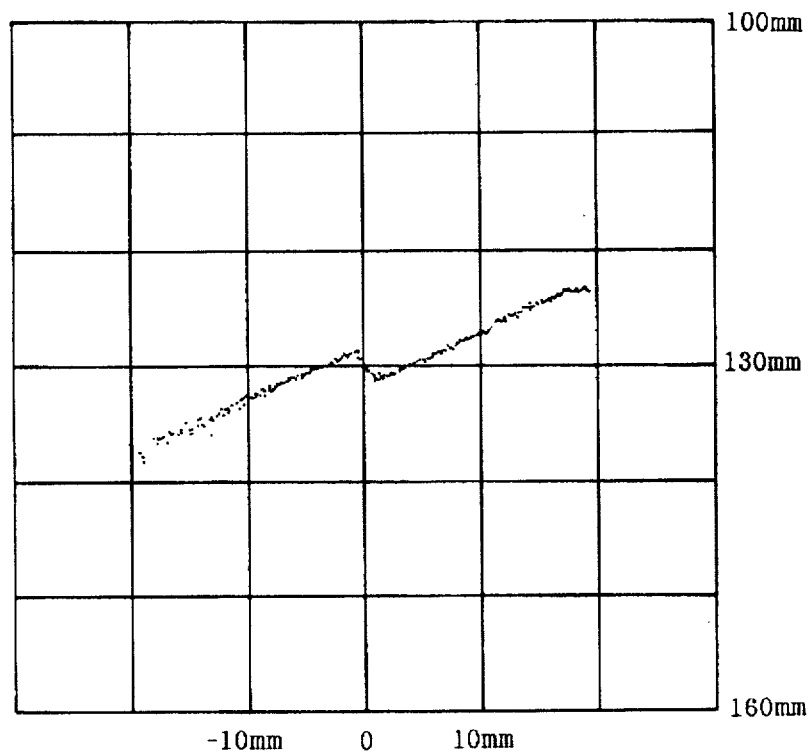
Figure 13C:
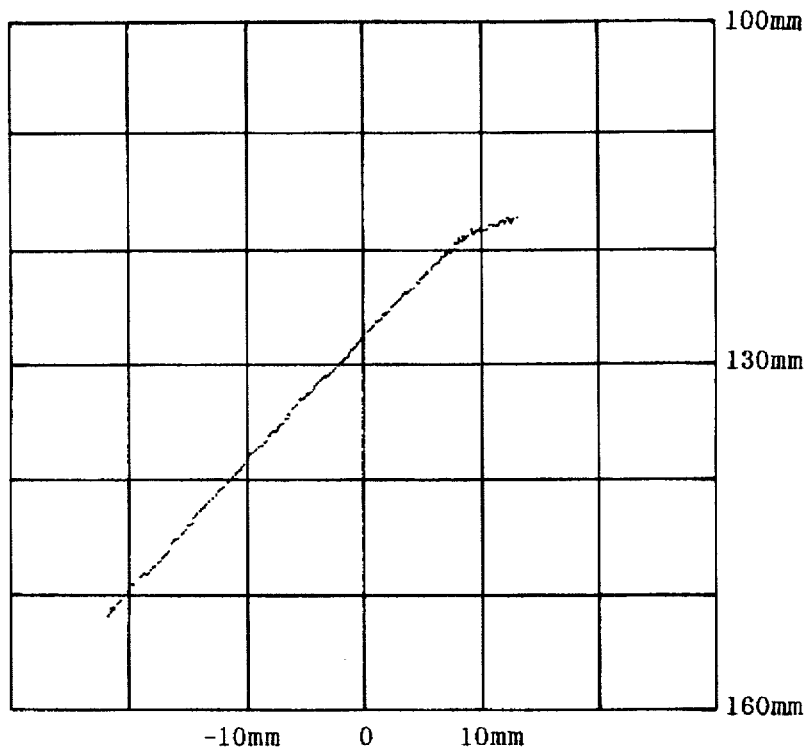
Figure 13D:
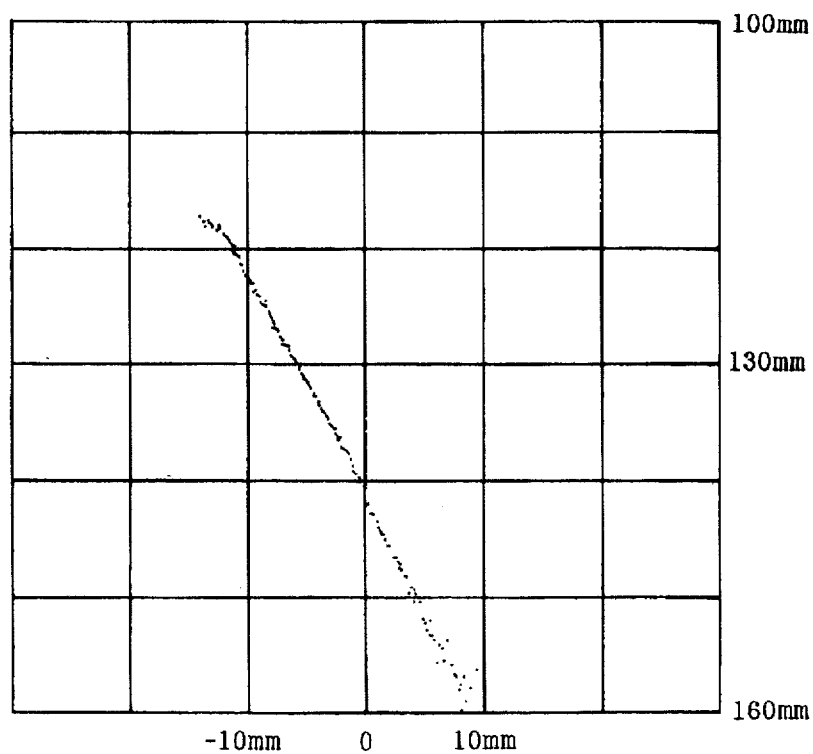
Figure 13E:
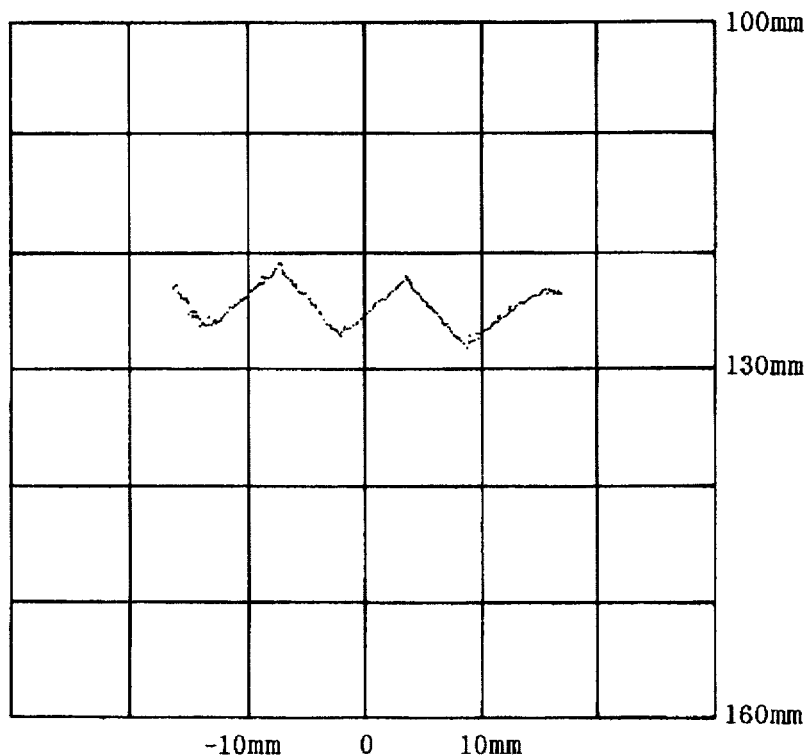
Figure 13F:
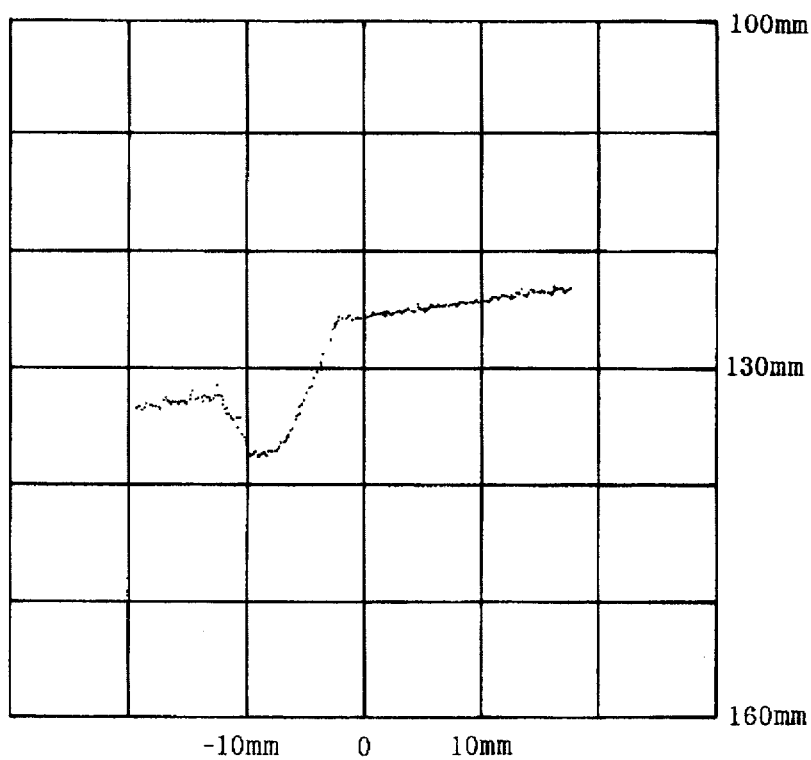
Figure 13G:
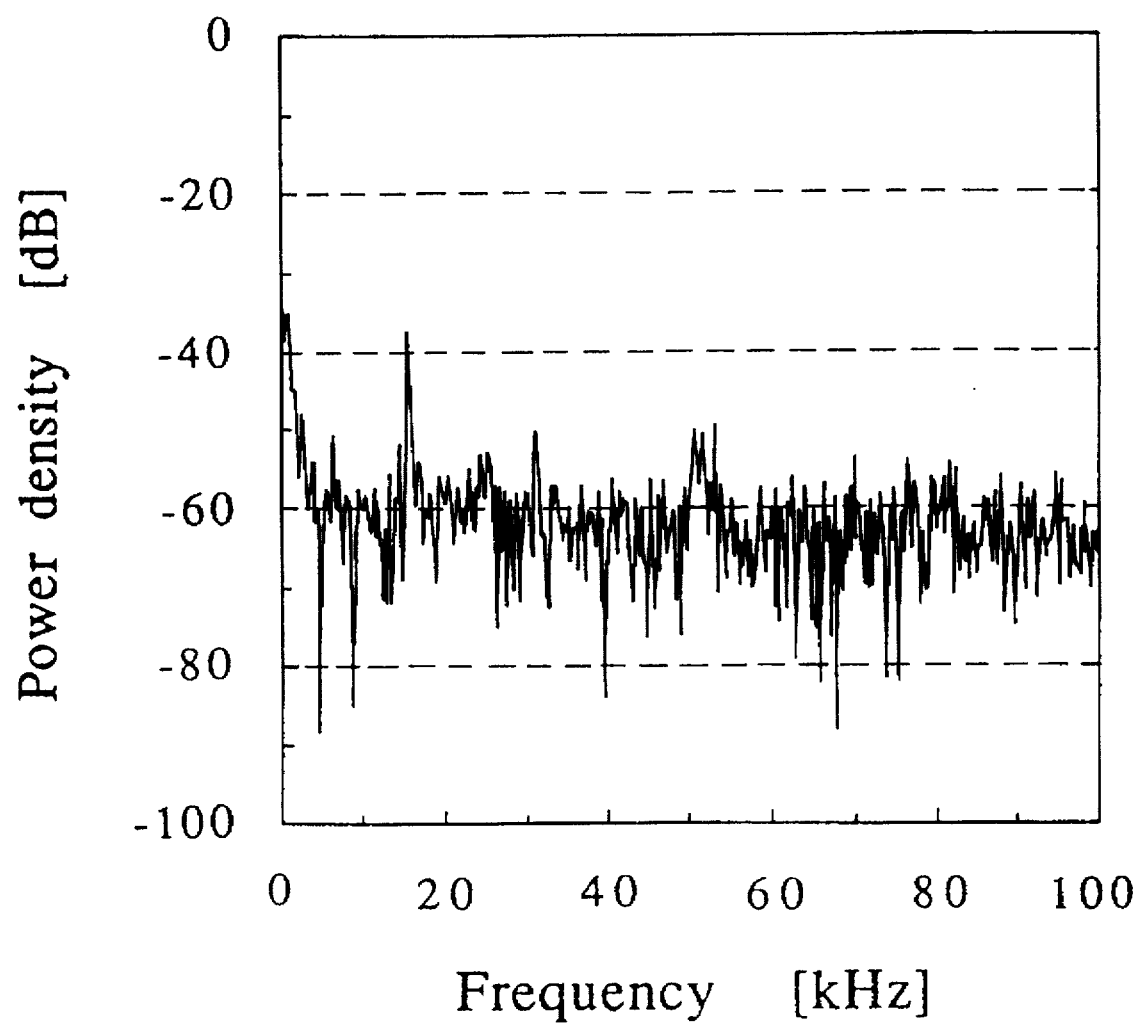
Figure 13H:
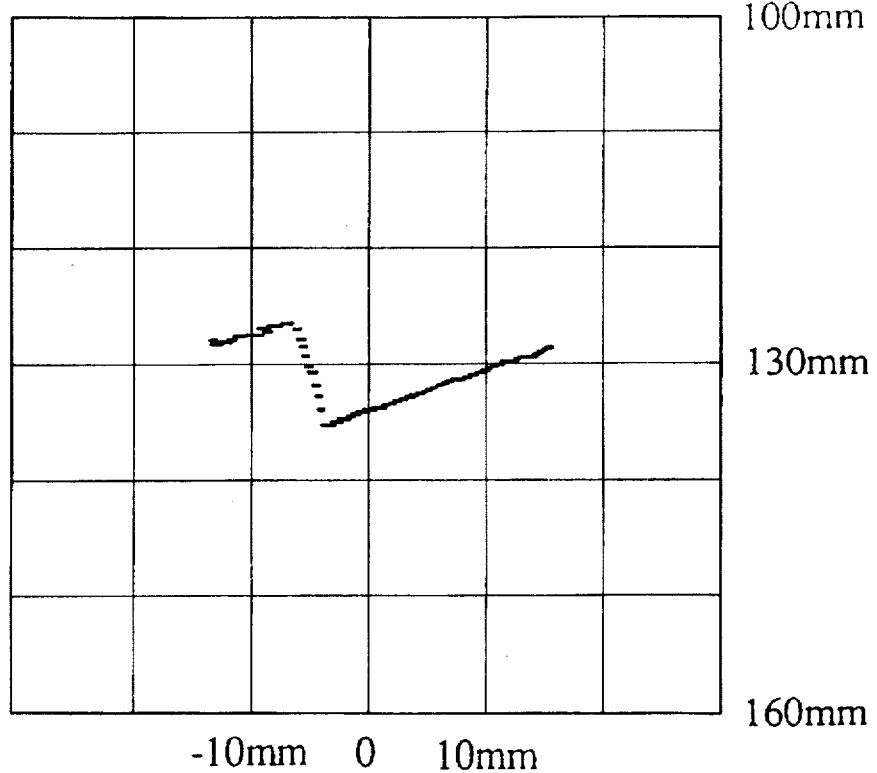
Figure 13I:
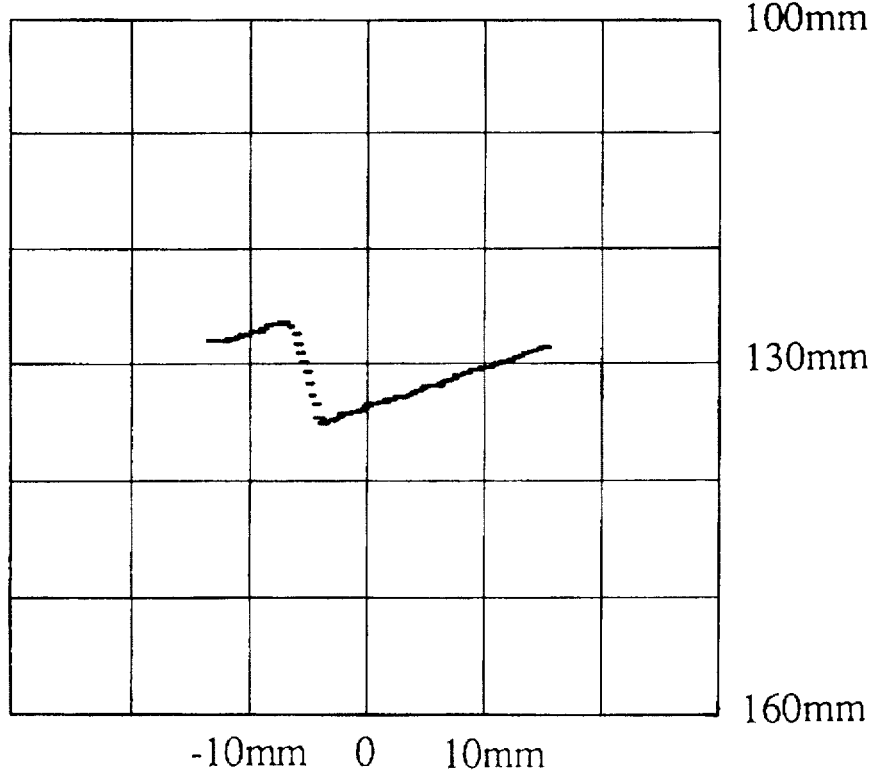

Next, measurement results relating to various types of objects according to the second embodiment will be described with reference to FIGS. 13(a) to (f). FIG. 13 (a) shows measurement results of a lap Joint of cold rolled carbon steel plates having a thickness of 3.2 mm. FIG. 13 (b) shows measurement results of the same lap joint, while arc current of 300 A is fed to the welding torch and whereby arc light is produced. The distance between the measuring point and the torch is 10 mm. When comparing the FIGS. 13 (a) and (b), it is recognized that the influence due to the arc light is extremely small, so that an accurate profile measurement had been executed. To evaluate the marginal readout scanning period for an arc light, a power spectrum of the arc light in $CO_2$ gas shielded arc welding has been measured as shown in FIG. 13(g). The spectrum diagram shows the arc light power concentrates below 1 kHz, although a weak peak is observed around 15 kHz, an inverter operating frequency of a welding torch electric source. This shows the marginal scanning period is around 100 μs, corresponding to a laser light on-and-off frequency of 5 kHz. FIGS. 13(h) and 13(i) show another experimental result of the second embodiment. The scanning period is set to 39.5 μs, five times larger than that of the case shown in FIGS. 13(a) and 13(b). FIG. 13(h) shows a profile of a lap joint of 9 mm-thick plates measured without the arc light, and FIG. 13(i) shows a profile of the same lap joint measured when the arc light is on. The influence of the arc light is eliminated again. The larger the scanning period is, the better sensitivity of the CCD image sensor is, because of longer photo-induced charge storage time. But the larger scanning period derives a slower profile measurement speed. Thus, in practice, according to a specific application, a trade-off between sensitivity and measurement speed determines the readout scanning period under the upper limit mentioned above. Further, FIGS. 13 (c) and (d) show measurement results relating to a cold rolled carbon steel plate wherein the plate respectively inclines "45" and "30" degrees corresponding to the directed laser beam of the measuring apparatus. According to the FIGS. 13 (c) and (d), the object profile can be measured by a high sensitive CCD image sensor in spite of the sharp inclination. FIG. 13 (e) shows measurement results of a saw tooth shaped steel piece block, and FIG. 13 (f) shows those of single-Vee-groove butt joint with backing, wherein the influence due to multiple reflection in the groove does not appear, so that an accurate profile measurement is executed. Incidentally, the measurement results FIGS. 13 (c) to (f) are ones without the arc light.

Further, this invention may be practiced or embodied in still other ways without departing from the spirit or essential character thereof. Therefore, the preferred embodiments described herein are illustrative and not restrictive. For example, in the first embodiment, the delay means which codes the output of the line sensor to the digital signal by means of A/D converter, and obtains the delayed output signal via the digital shift register, have been adopted as the one-line delay means in order to execute the subtraction operation between output signals of the CCD linear image sensor having time difference of one line period.

However, it can be embodied such that output analog signals of the CCD linear image sensor are delayed as it is by means of analog type CCD shift register or acoustic delay line, supply the original signal and the delayed signal are supplied to a differential amplifier, and whereby a differential signal is obtained. In this case, the writing operation to the buffer memory shall be executed after the differential output signal is converted to a digital signal. Such embodiments having alternative delay means, as well as the modified memory composition, modified coordinate calculation means due to the triangulation principle and the like may be practiced or embodied in still other ways without departing from the spirit or essential character thereof by those skilled in the art.

Similarly, one-line period delayed read out circuit means for the linear scanning signal, subtraction operation means for the adjacent linear scanning signals, averaging by repetitive addition processing means for the subtraction operation output signals, centroid address calculation means for the subtraction operation output which is averaged by the repetitive addition, memory composition, coordinate calculation means due to the triangulation principle, and the like which are disclosed in the second embodiment, may be practiced or embodied in still other ways without departing from the spirit or essential character thereof. Therefore, the scope of the invention being indicated by the appended claims, and all variations which come within the meaning of the claims are intended to be embraced therein.

What is claimed is:

1. A method for measuring an external profile of an object in robotic arc-welding, said method being based on triangulation operations and capable of performing a measurement under existence of arc light with fluctuating intensity at relatively low frequency, said method for measuring an external profile comprising the steps of:

intermittently emitting a laser beam onto a surface of said object at a sufficiently shorter time interval than a fluctuation period of intensity of the arc-light;

repeatedly sensing reflected light from said surface during a predetermined sensing period in synchronism with emission of the laser beam, by means of a plurality of charge storage type light receiving elements arrayed in line;

generating output signals responsive to said reflected laser beam and to the arc light;

generating delayed signals, for said output signals, delayed by one line period of the charge storage type light receiving array;

obtaining difference values between said output signals and said delayed signals so that said difference values are indicative of the difference between output signals while said laser beam is on and while said laser beam is off to enable elimination of influence of said arc light; and determining positions of points on said surface based on said difference values.

2. A method for measuring an external profile of an object according to claim 1, wherein said predetermined sensing period is equal to or shorter than 100 microseconds.

3. An apparatus for measuring an external profile of an object in robotic arc welding, said apparatus being based on triangulation operations and capable of performing a measurement under existence of arc light, the intensity of which fluctuates over time at relatively low frequency, said apparatus for measuring an external profile comprising:

a plurality of charge storage type light receiving elements arrayed in line for repeatedly sensing reflected light from a surface of said object during a sensing period of a predetermined interval and generating output signals;

laser means for intermittently emitting a laser beam onto the surface in synchronism with said sensing period in such a way that the surface is illuminated;

delay means for generating delayed output signals of said light receiving elements delayed by said predetermined time interval;

calculating means for obtaining difference values between said output signals of said light receiving elements and said delayed signals, which correspond to difference values between output signals of said light receiving elements while said laser beam is on and output signals of said light receiving elements while said laser beam is off, thereby eliminating influence of said arc light, and for determining positions of points on said surface based on the difference values.

4. An apparatus for measuring an external profile of an object according to claim 3 wherein said sensing period is equal to or shorter than 100 microseconds.

5. An apparatus for measuring an external profile of an object in arc-welding according to claim 3, wherein said charge storage type light receiving element, comprise a CCD line sensor with 1×N arrayed light receiving elements, wherein N is a natural number.

6. A method for measuring an external profile in robotic arc-welding, said method being based on triangulation operations and capable of performing a measurement under existence of arc light with fluctuating intensity, said method for measuring an external profile comprising the steps of:

intermittently emitting a laser beam onto a surface of said object at predetermined time intervals and scanning the laser beam on the surface of said object;

repeatedly sensing reflected light from said surface during a predetermined sensing period in synchronism with emission of the laser beam, by means of a plurality of charge storage type light receiving elements arrayed in line;

generating first sensing output signals for a turned-on period of said laser beam, as either first as-sensed output signals or first delayed output signals delayed by said predetermined sensing period;

generating second output signals for a turned-off period of said laser beam, as either second delayed output signals or second as-sensed output signals, respectively, depending on whether the first sensing output signals are first as-sensed output signals or first delayed output signals, respectively, second delayed output signals being delayed by said predetermined sensing period;

obtaining a difference value between each of said first and second as-sensed output signals and the respective concurrent one of said second and first delayed output signals so that said difference values are indicative of a difference between output signals while said laser beam is on and while said laser beam is off to enable elimination of influence of said arc light; and determining positions points on said surface based on said difference values;

wherein said predetermined sensing period is determined to be shorter than a fluctuation period of said intensity of said arc light, and wherein the method further includes the step of repetitively adding current difference values to enable suppression of fluctuation of the difference values.

7. An apparatus for measuring an external profile of an object in arc welding, said apparatus being based on triangulation operations and capable of performing a measurement under existence of arc light, the intensity of which fluctuates over time, said apparatus for measuring an external profile comprising:

a plurality of charge storage type light receiving elements arrayed in line for repeatedly sensing reflected light from a surface of said object with a predetermined sensing period;

laser means for intermittently emitting a laser beam onto said surface in synchronism with the sensing of the reflected light in such a way that said surface is illuminated;

scanning means for scanning said laser beam on the surface of the object;

output means for generating first output signals for a turned-on period, said first output signals being either as-sensed output signals or delayed output signals delayed by said turned-on period;

output means for generating second output signals as either delayed output signals delayed by said predetermined period or as-sensed output signals, respectively, depending on whether the first output signals are as-sensed or delayed, said second output signals being for said turned-off period of the laser beam;

calculating means for obtaining difference values between each pair of respective concurrent ones of said first and second output signals of said light receiving elements, which correspond to difference values between output signals of said light receiving elements while said laser beam is on and output signals of said light receiving elements while said laser beam is off, thereby eliminating influence of said arc light, and for determining positions of points on said surface based on said difference values;

wherein said predetermined sensing period is determined to be shorter than a fluctuation period of said intensity of said arc light, and wherein said calculating means further includes a means for repetitively adding a current difference value to the aforesaid obtained difference values and averaging the difference values to enable suppression of fluctuation of the difference values.

* * * * *

UNITED STATES PATENT AND TRADEMARK OFFICE
CERTIFICATE OF CORRECTION

PATENT NO. : 5,739,912
DATED : April 14, 1998
INVENTOR(S) : Akira Ishii

It is certified that error appears in the above-identified patent and that said Letters Patent is hereby corrected as shown below:

On the Title page, Item [75], in the inventor, "TOKYO" should read --KYOTO--.

Title page, Item [57] line 13, in the Abstract, "10ns to 100ns" should read --10µs to 100µs--.

In claim 5, column 26, line 8, "element" should read --elements--.

Signed and Sealed this

Twenty-third Day of March, 1999

Attest:

Q. TODD DICKINSON

Attesting Officer

Acting Commissioner of Patents and Trademarks